United States Patent
Mizude et al.

(10) Patent No.: US 10,412,248 B2
(45) Date of Patent: Sep. 10, 2019

(54) IMAGE READING APPARATUS

(71) Applicant: Sharp Kabushiki Kaisha, Sakai, Osaka (JP)

(72) Inventors: Kazuhiro Mizude, Sakai (JP); Kazuma Ogawa, Sakai (JP); Tatsuya Fujisaki, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 78 days.

(21) Appl. No.: 15/838,521

(22) Filed: Dec. 12, 2017

(65) Prior Publication Data
US 2018/0103169 A1 Apr. 12, 2018

Related U.S. Application Data

(63) Continuation of application No. 15/356,731, filed on Nov. 21, 2016, now Pat. No. 9,876,925.

(51) Int. Cl.
H04N 1/00 (2006.01)
H04N 1/38 (2006.01)
H04N 1/387 (2006.01)

(52) U.S. Cl.
CPC ..... *H04N 1/00806* (2013.01); *H04N 1/00748* (2013.01); *H04N 1/00753* (2013.01); *H04N 1/00758* (2013.01); *H04N 1/38* (2013.01); *H04N 1/3873* (2013.01); *H04N 2201/0081* (2013.01); *H04N 2201/0094* (2013.01)

(58) Field of Classification Search
CPC ........... H04N 1/00806; H04N 1/00748; H04N 1/00753; H04N 1/00758; H04N 1/38; H04N 1/3873; H04N 2201/0081; H04N 2201/0094
See application file for complete search history.

(56) References Cited

U.S. PATENT DOCUMENTS

| | | | |
|---|---|---|---|
| 5,880,858 A * | 3/1999 | Jin | H04N 1/00681 358/453 |
| 2007/0013974 A1* | 1/2007 | Hattori | H04N 1/3872 358/486 |

OTHER PUBLICATIONS

Mizude et al., "Image Reading Apparatus", U.S. Appl. No. 15/356,731, filed Nov. 21, 2016.

* cited by examiner

*Primary Examiner* — Quang N Vo
(74) *Attorney, Agent, or Firm* — Keating & Bennett, LLP

(57) ABSTRACT

An image reading apparatus comprising: an original reading unit configured to read an image of each of multiple originals placed on an original table in batch by a batch-scan; a cropping unit configured to crop an image of each original from an entire image which is read by the batch-scan; an image output unit configured to output a cropped image of each original; and a control unit configured to control the original reading unit, the cropping unit, and the image output unit, wherein the control unit makes the original reading unit read the image by a batch-scan in which an image density of an edge of each original is supposed to be lower than an image density of a reading-area outside of the original, and an area to be cropped is determined on the basis of a difference in the image density between the edge and the reading-area outside of the original.

3 Claims, 43 Drawing Sheets

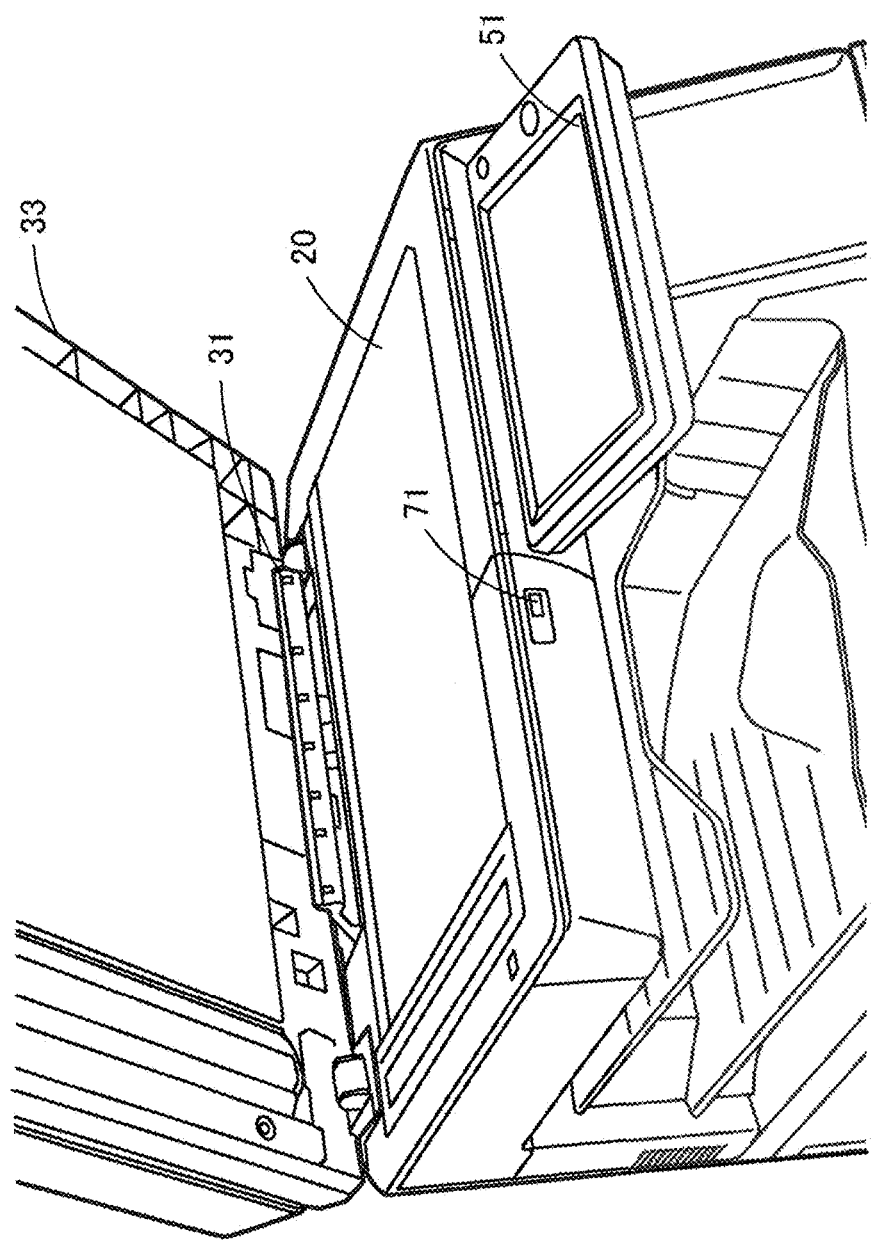

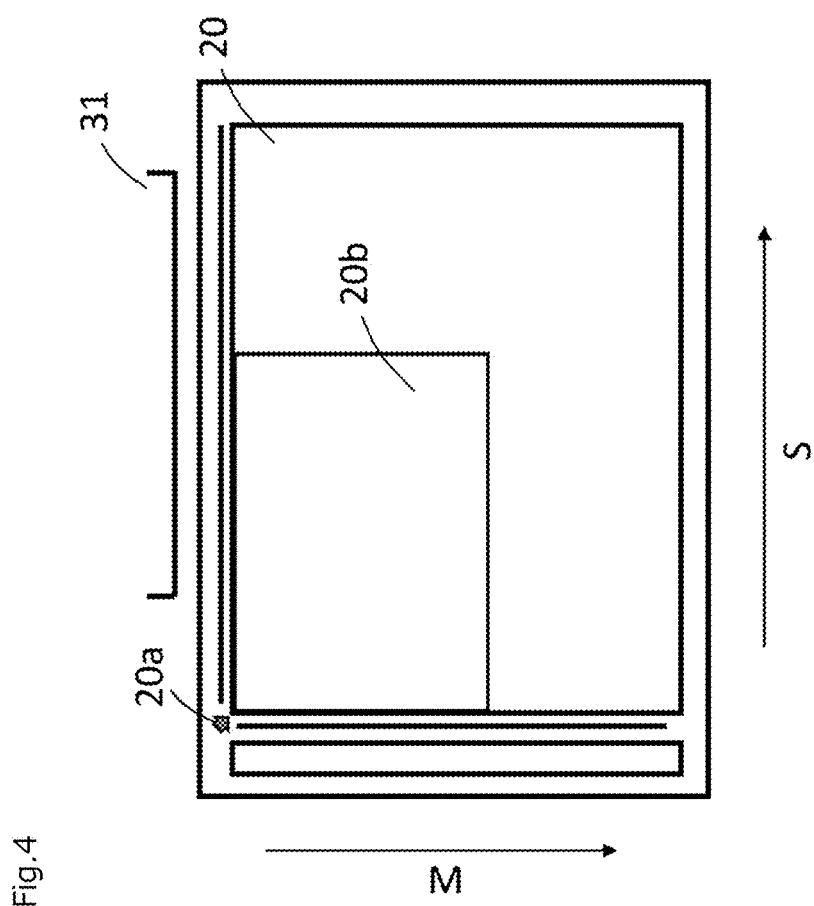

Fig.7

|      | D01 | D02 | D03 | D04 | D05 | D06 | D07 |
|------|-----|-----|-----|-----|-----|-----|-----|
| None | ○   | ○   | ○   | ○   | ○   | ○   | ○   |
| A5   | ×   | ○   | ○   | ○   | ○   | ○   | ○   |
| B5   | ×   | ×   | ○   | ○   | ○   | ○   | ○   |
| A4   | ×   | ×   | ×   | ○   | ○   | ○   | ○   |
| B5R  | ×   | ×   | ×   | ×   | ○   | ○   | ○   |
| A4R  | ×   | ×   | ×   | ×   | ×   | ○   | ○   |
| B4   | ×   | ×   | ×   | ×   | ×   | ×   | ○   |
| A3   | ×   | ×   | ×   | ×   | ×   | ×   | ×   |

Fig.8

|            | D01 | D02 | D03 | D04 | D05 | D06 | D07 |
|------------|-----|-----|-----|-----|-----|-----|-----|
| None       | ○   | ○   | ○   | ○   | ○   | ○   | ○   |
| 5.5"x8.5"  | ×   | ○   | ○   | ○   | ○   | ○   | ○   |
| B5         | ×   | ×   | ○   | ○   | ○   | ○   | ○   |
| 8.5"x11"   | ×   | ×   | ×   | ○   | ○   | ○   | ○   |
| B5R        | ×   | ×   | ×   | ×   | ○   | ○   | ○   |
| 8.5"x11"R  | ×   | ×   | ×   | ×   | ×   | ○   | ○   |
| 8.5"x14"   | ×   | ×   | ×   | ×   | ×   | ×   | ○   |
| 11"x17"    | ×   | ×   | ×   | ×   | ×   | ×   | ×   |

Fig.9

|   | D01 | D02 | D03 | D04 | D05 | D06 | D07 |
|---|-----|-----|-----|-----|-----|-----|-----|
|   | ×   | ×   | ×   | ○   | ×   | ×   | ×   |

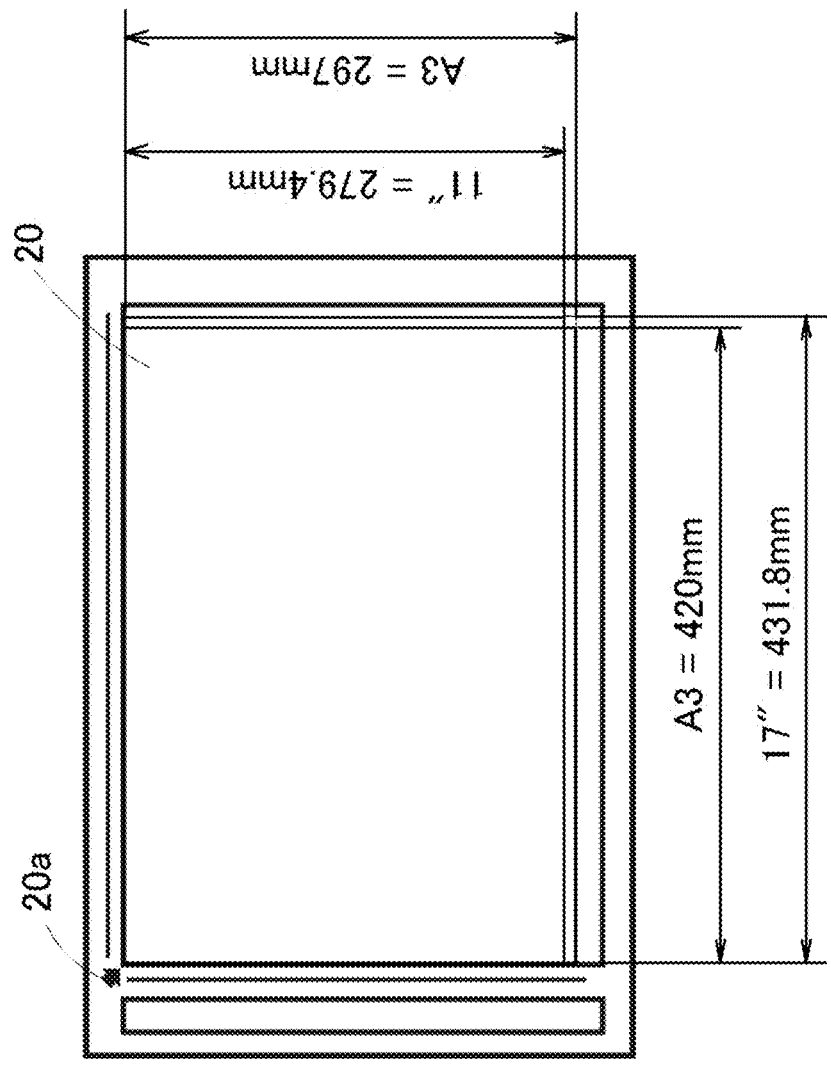

image20150123_0918.pdf

Standard size original

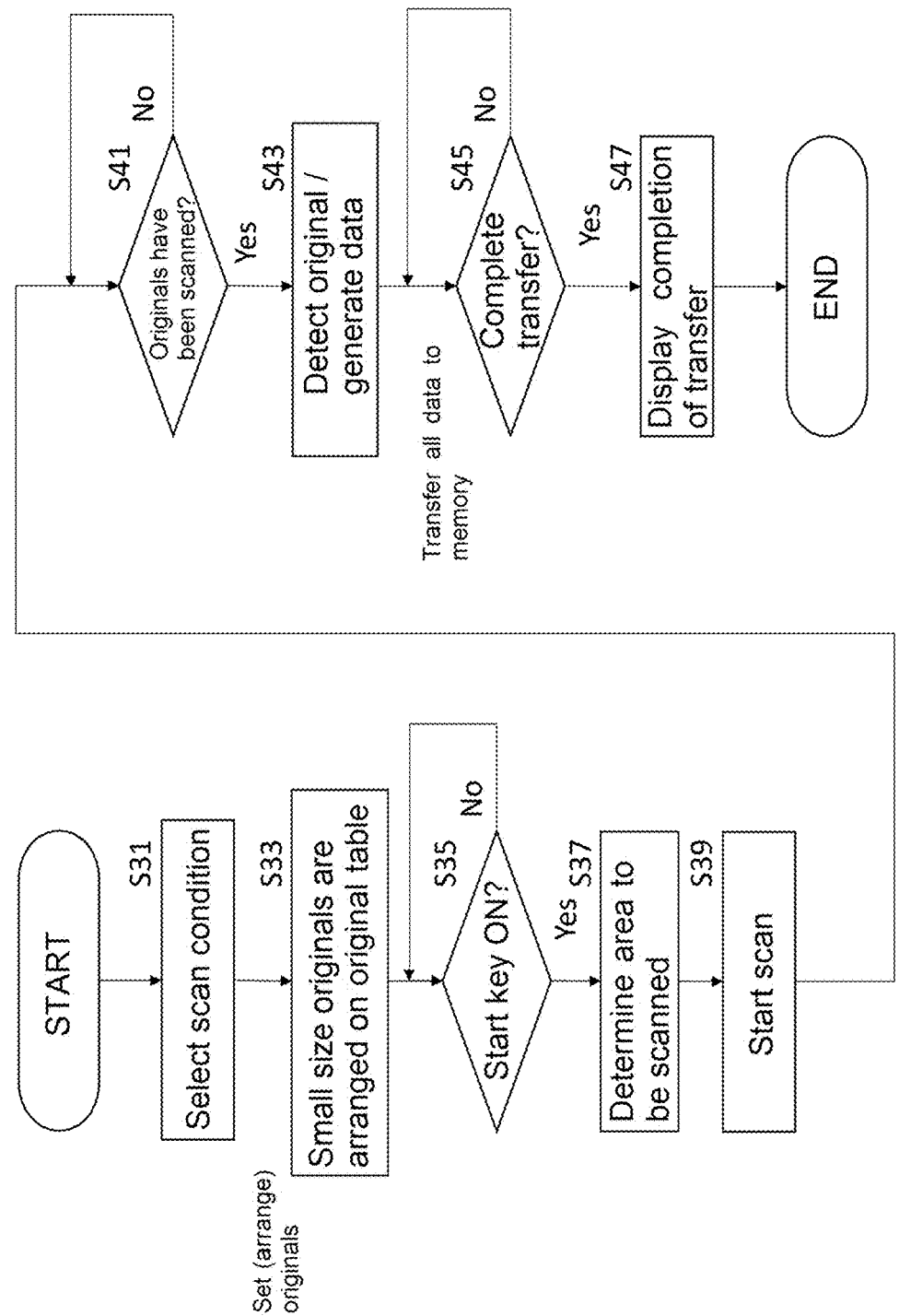

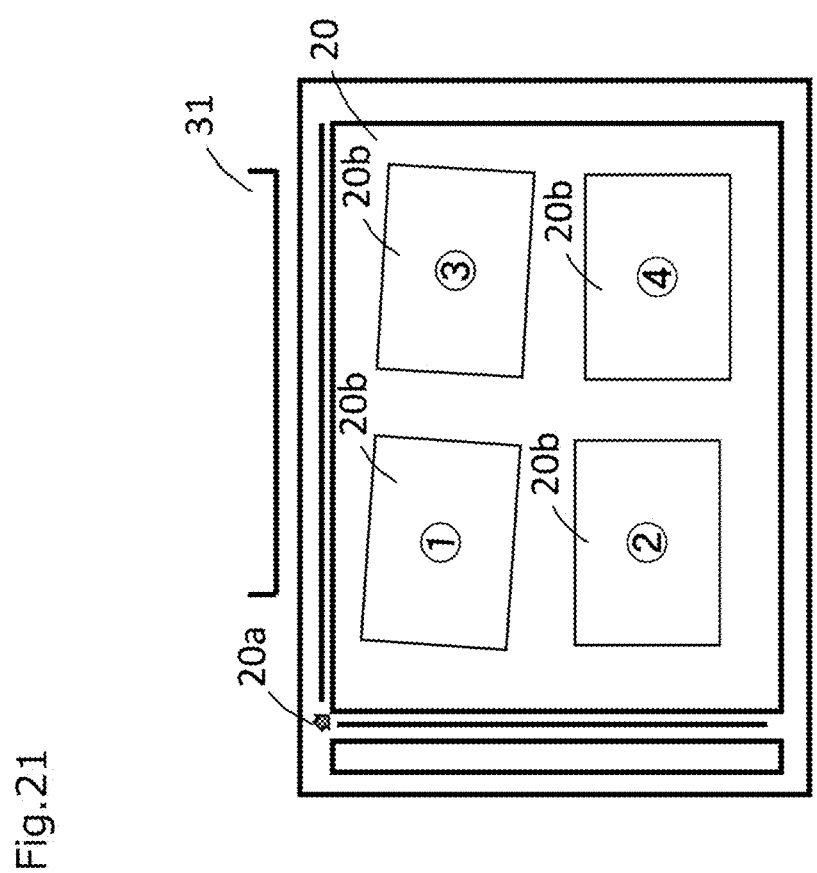

Fig.24E

Originals have been scanned.
(Pg.No.2)

Multi-crop scan
Original count

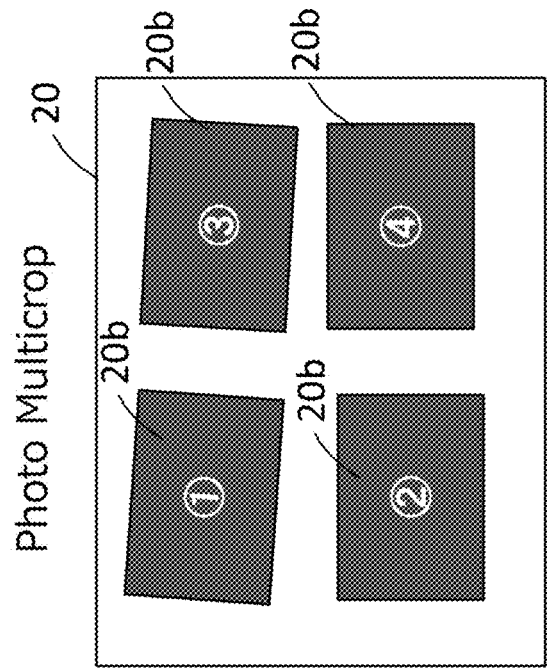
Fig.27B Photo Multicrop
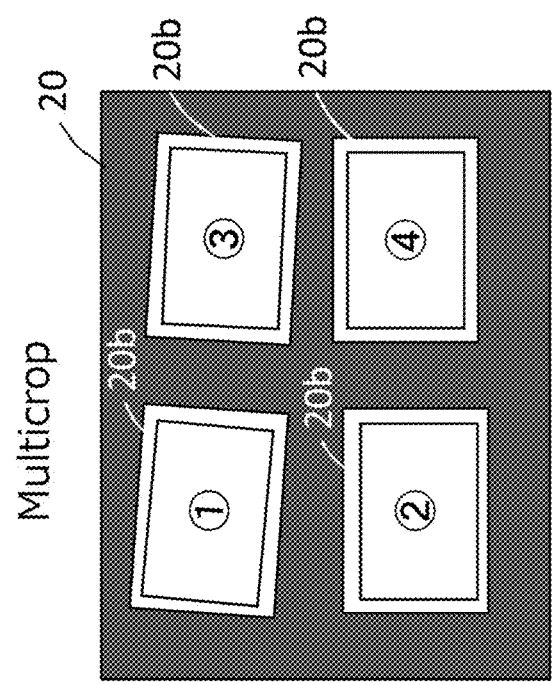
Fig.27A Multicrop

IMAGE READING APPARATUS

CROSS-REFERENCE TO RELATED APPLICATION

This application is a Continuation of copending application Ser. No. 15/356,731, filed on Nov. 21, 2016 and claims priority under 35 U.S.C. § 119(a) to Application No. 2015-234892 filed in Japan on Dec. 1, 2015, all of which are hereby expressly incorporated by reference into the present application.

BACKGROUND OF THE INVENTION

1. Field of the Invention

The present invention relates to an image reading apparatus having a multi-crop function.

2. Description of the Related Art

There has been known a multi-crop function in which, in the case where small size originals, such as business cards, postcards, or photos, are to be read, multiple originals are placed on an original table and scanned and read in batch to crop an image corresponding to each original. There has also been known an image reading apparatus having such multi-crop function.

For example, there has been proposed an apparatus which detects the number of originals and their respective positions by pre-scan, scans the originals one by one, and displays how many originals have been scanned before the currently-scanned original, so as to enable a user to recognize an image reading state (see Japanese Unexamined Patent Publication No. 2003-219085, for example). There has also been proposed an apparatus that controls the order of cropping an image according to the original size of a cropped image, the position of the original, a size of a printing sheet used to print the original, and the type of the printing sheet, even if originals of different sizes and different types are simultaneously placed (see Japanese Unexamined Patent Publication No. 2007-013378, for example). There has also been proposed an apparatus that compares the input number of originals and the detected number of originals, and displays the comparison result, in order to correctly detect the number of images that the user desires to crop and to read these images (see Japanese Unexamined Patent Publication No. 2007-020122, for example).

One of useful methods out of methods for cropping an image corresponding to each original is to extract a border between an original and an area outside of the original on the premise that the original has a rectangular shape and has a white or light tone edge. To clearly read the border, the area outside of the original is configured to be read as black or dark tone. For example, it is supposed that there is an image reading apparatus of a type that emits light from below an original surface and reads reflection light diffusely reflected on the original surface. When reading an original, the image reading apparatus generally scans the original by holding the original from top using an original cover. However, when a multi-crop process is selected, the image reading apparatus notifies the user that the original has to be scanned with the original cover being left open. When the original is scanned with the original cover being left open, diffused reflection of emitted light is not generated on the area outside of the original. On the other hand, reflection light diffusely reflected on the original surface is returned to the white or light tone edge of the original. A difference in contrast is generated between an image to be read on the edge of the original to which reflection light is returned and an image to be read on the area outside of the original. The border of the original can be determined on the basis of the contrast. Notably, in place of the way in which a batch scan is performed with the original cover being left open, the lower surface of the original cover may be formed to have a black color or dark tone to enable absorption of light, or the lower surface of the original cover may be formed such that diffused reflection hardly occurs, for example, formed from a mirror-finished metal surface.

A typical original such as an office document includes characters, graphics, or images on a white sheet, and there is a margin on an edge thereof. However, this is not always the case for particularly originals to which a multi-crop scan is to be performed. For example, photos without borders or cards using colored sheets do not always have a white or light tone edge, although they are rectangle.

SUMMARY OF THE INVENTION

The present invention is accomplished in view of the above circumstances, and provides an image reading apparatus that can appropriately crop an image of an original, regardless of a type of an original, particularly regardless of whether an original has a light tone edge or a dark tone edge.

The present invention provides an image reading apparatus comprising: an original reading unit configured to read an image of each of multiple originals placed on an original table in batch by a batch-scan; a cropping unit configured to crop an image of each original from an entire image which is read by the batch-scan; an image output unit configured to output a cropped image of each original; and a control unit configured to control the original reading unit, the cropping unit, and the image output unit, wherein the control unit makes the original reading unit read the image by a batch-scan in which an image density of an edge of each original is supposed to be lower than an image density of a reading-area outside of the original, and an area to be cropped is determined on the basis of a difference in the image density between the edge and the reading-area outside of the original.

In the image reading apparatus according to the present invention, the control unit makes the original reading unit read the image by a batch-scan in which an image density of an edge of each original is supposed to be lower than an image density of a reading-area outside of the original, and an area to be cropped is determined on the basis of a difference in the image density between the edge and the reading-area outside of the original. Thus, an image of an original can appropriately be cropped in a case where the original has a light tone edge.

BRIEF DESCRIPTION OF THE DRAWINGS

FIG. 3 is a perspective view showing an appearance of an original table and surrounding thereof in the digital multifunction peripheral shown in FIG. 1;

FIG. 4 is an explanatory view showing the state in which an original is placed at a predetermined position on the original table shown in FIG. 3;

FIG. 7 is an explanatory diagram showing presence or absence (presence/absence) of each detection beam from the original size detection unit according to the present invention (corresponding to FIG. 5C);

FIG. 8 is an explanatory diagram showing presence/ absence of each detection beam from the original size detection unit according to the present invention (corresponding to FIG. 6C);

FIG. 9 is an explanatory view showing presence/absence of each detection beam from the original size detection unit according to the present invention when multiple originals are placed on the original table (corresponding to later-described FIG. 19B);

FIG. 10 is an explanatory view showing a reading-area corresponding to maximum size originals respectively shown in FIGS. 5B and 6B;

FIG. 14C is a third explanatory view showing the operation procedure of the digital multifunction peripheral shown in FIG. 1 when a single multi-crop scan is executed;

FIG. 14D is a fourth explanatory view showing the operation procedure of the digital multifunction peripheral shown in FIG. 1 when a single multi-crop scan is executed;

FIG. 14F is a sixth explanatory view showing the operation procedure of the digital multifunction peripheral shown in FIG. 1 when a single multi-crop scan is executed;

Figures 16A, 16B:
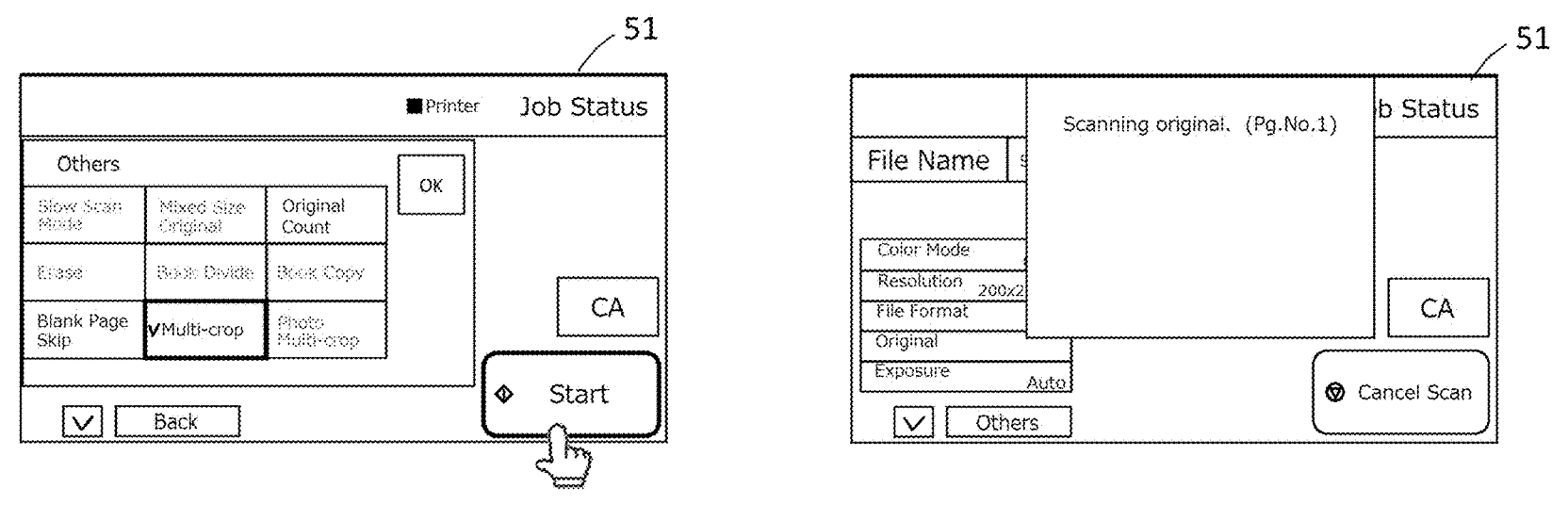

FIG. 16A is a seventh explanatory view showing the operation procedure of the digital multifunction peripheral shown in FIG. 1 when a single multi-crop scan is executed;

FIG. 16B is an eighth explanatory view showing the operation procedure of the digital multifunction peripheral shown in FIG. 1 when a single multi-crop scan is executed;

FIG. 18 is a flowchart showing a process executed by the control unit while in the single multi-crop scan;

FIG. 21 is an explanatory view showing the state in which multiple originals for the first batch scan are placed on the original table shown in FIG. 3;

FIG. 22B is a fourth explanatory view showing the operation procedure of the digital multifunction peripheral shown in FIG. 1 when a continuous multi-crop scan is executed;

FIG. 22C is a fifth explanatory view showing the operation procedure of the digital multifunction peripheral shown in FIG. 1 when a continuous multi-crop scan is executed;

FIG. 24A is a sixth explanatory view showing the operation procedure of the digital multifunction peripheral shown in FIG. 1 when a continuous multi-crop scan is executed;

FIG. 24B is a seventh explanatory view showing the operation procedure of the digital multifunction peripheral shown in FIG. 1 when a continuous multi-crop scan is executed;

FIG. 24E is a tenth explanatory view showing the operation procedure of the digital multifunction peripheral shown in FIG. 1 when a continuous multi-crop scan is executed;

FIG. 27A is an explanatory view showing an example of an image obtained by reading multiple originals having light tone edges with the original cover being left open;

FIG. 27B is an explanatory view showing an example of an image obtained by reading multiple originals having dark tone edges with the original cover being closed;

FIG. 29A is a first explanatory view showing another embodiment of an operation procedure of the digital multifunction peripheral shown in FIG. 1 when a photo multi-crop is executed;

FIG. 29B is a second explanatory view showing another embodiment of the operation procedure of the digital multifunction peripheral shown in FIG. 1 when a photo multi-crop is executed;

FIG. 29E is a fifth explanatory view showing another embodiment of the operation procedure of the digital multifunction peripheral shown in FIG. 1 when a photo multi-crop is executed;

FIG. 29F is a sixth explanatory view showing another embodiment of the operation procedure of the digital multifunction peripheral shown in FIG. 1 when a photo multi-crop is executed;

DESCRIPTION OF THE PREFERRED EMBODIMENTS

The present invention will be described below in more detail with reference to the drawings. Note that the description below should be considered in all aspects as illustrative and not restrictive of the present invention.

<<Outline of Image Reading Apparatus>>

A specific example of an image reading apparatus according to the present embodiment will be described.

Figure 1:
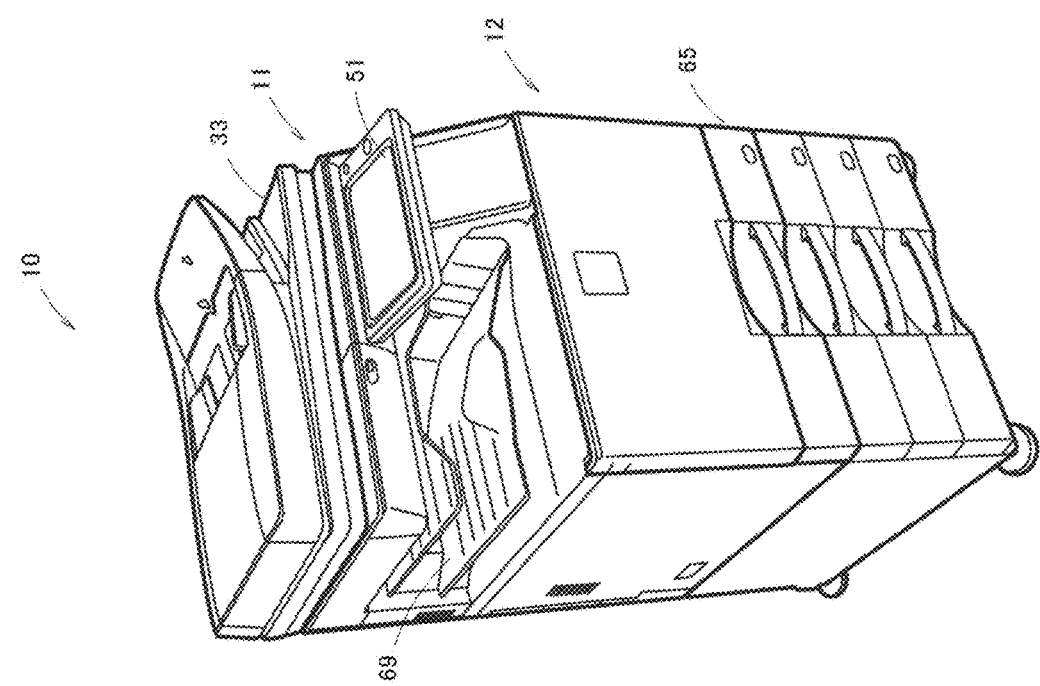
FIG. 1 is a perspective view of an appearance of a digital multifunction peripheral shown as one example of an image reading apparatus according to the present invention.
Figure 2:
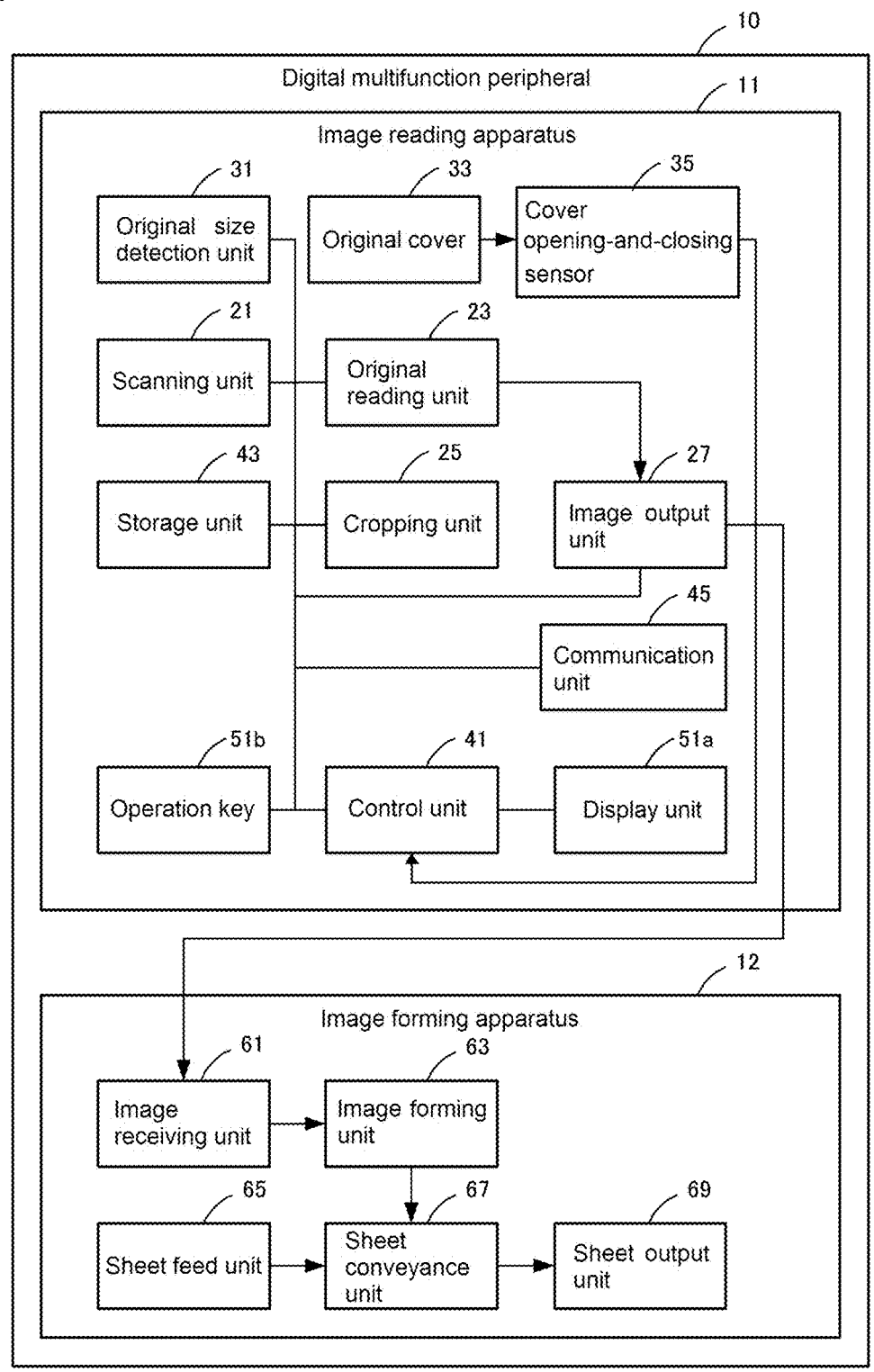
FIG. 2 is a block diagram showing the configuration of the digital multifunction peripheral shown in FIG. 1.

FIG. 1 is a perspective view showing an appearance of a digital multifunction peripheral shown as one example of the image reading apparatus of the present invention. FIG. 2 is a block diagram showing the configuration of the digital multifunction peripheral shown in FIG. 1.

The digital multifunction peripheral 10 shown in FIGS. 1 and 2 includes an image reading apparatus 11 according to the present embodiment and an image forming apparatus 12 performing printing. The digital multifunction peripheral 10 is connectable to an unillustrated network through a communication unit 45. The digital multifunction peripheral 10 can transmit image data of an original read by the image reading apparatus 11 to an external device through the network. The digital multifunction peripheral 10 can receive print data from an external device through the network and print the received print data by the image forming apparatus 12. The digital multifunction peripheral 10 has a copying function, a printer function, a scanner function, an image filing function, and a facsimile function.

An original cover 33 shown in FIG. 1 also serves as an automatic document feeder. A user can manually open the original cover 33 upward. When used as the automatic document feeder, the original cover 33 is closed. When the original cover 33 is opened upward, an original table (not shown in FIG. 1) provided below the original cover 33 appears. The user can place an original on the original table and cause the image reading apparatus 11 to read the original. A cover opening-and-closing sensor 35 (see FIG. 2) detects whether the original cover is opened or closed.

The original table is formed from transparent glass, and below the original table, a scanning unit 21 that is a mechanism for scanning an original while moving and an original reading unit 23 that is an electronic circuit for reading an image of an original scanned by the scanning unit 21 are provided. In the present embodiment, the original reading unit is original reading circuitry including a linear image sensor.

The image reading apparatus 11 also includes an image processing circuit. The image processing circuit includes a cropping unit 25 that crops an image of an original from a reading-area which is scanned by the scanning unit 21 and read by the original reading unit 23.

The image reading apparatus 11 also includes an image output unit 27. The image output unit 27 gives a filename to image data, which has been read, and stores the resultant image data in a storage unit 43 serving as a memory or an USB memory connected to a later-described USB connector 71 (shown in FIG. 3 described later). Alternatively, the image output unit 27 sends the resultant image data to the image forming apparatus 12 or to an external device through the network by the communication unit 45. Note that the communication unit 45 is communication circuitry which can perform communication through a public telephone line, besides LAN or WAN. The transmission/reception of image data through the public telephone line corresponds to the facsimile function.

An original size detection unit 31 detects the size of an original set on the original table or on the automatic document feeder. Note that a detectable original size is limited to sizes of predetermined types (the above-mentioned standard size).

As shown in FIG. 1, an operation display unit 51 including a liquid crystal display panel and a touch panel is provided in front of the original table. In FIG. 2, the liquid crystal display panel corresponds to a display unit 51a. The touch panel covering the display surface of the liquid crystal display panel corresponds to an operation key 51b.

The control unit 41 performs controls of each component, such as the detection of the size of an original by the original size detection unit 31, scanning of an original by the scanning unit 21, reading of an image by the original reading unit 23, a display on the display unit 51a, and reception of an operation by the operation key 51b. The control unit 41 is control circuitry including a CPU for controlling the components mentioned above.

The image forming apparatus 12 includes an image receiving unit 61 that receives an image read by the image reading apparatus 11 or image data sent from an apparatus other than the image reading apparatus 11. The image forming apparatus 12 also includes an image forming unit 63 that forms a visible image on the basis of the acquired image data. The image forming unit 63 forms an image with a known method such as an electrophotographic method or an ink jet method. A sheet feed unit 65 feeds a printing sheet to the image forming unit 63, and a sheet conveyance unit 67 conveys the printing sheet fed from the sheet feed unit 65 to the image forming unit 63. The image forming unit 63 transfers the formed image onto a conveyed printing sheet, fuses the image onto the printing sheet, and outputs the resultant sheet onto a sheet output unit 69.

The operation of the image forming apparatus may be controlled by an exclusive control unit not shown in FIG. 2. However, in the present embodiment, the control unit 41 also performs the controls described above.

<<Original Table and Detection of Original Size>>

The original table and the detection of the size of an original placed on the original table in the present embodiment will be described below.

FIG. 3 is a perspective view showing an appearance of the original table and surrounding thereof in the digital multifunction peripheral shown in FIG. 1. In FIG. 3, the original cover 33 is opened upward, and the original table 20 is provided below the original cover 33. The original size detection unit 31 is mounted at the far side of the original table 20. When the original cover 33 is opened, i.e., when the cover opening-and-closing sensor 35 detects the open state, the original size detection unit 31 is located above the original table 20. On the other hand, when the original cover 33 is closed, the original size detection unit 31 is pressed by the original cover 33 to be moved downward. Note that FIG. 3 shows only a part of the original size detection unit 31. The other part of the original size detection unit 31 is disposed at an unillustrated portion below the original table 20. The function of the original size detection unit 31 including the unillustrated part will be described later.

The operation display unit 51 and the USB connector 71 are provided on the near side of the original table 20. The USB connector 71 is a connector for connecting an USB device such as an USB memory to the digital multifunction peripheral 10. The digital multifunction peripheral 10 has a function of reading an original placed on the original table 20 and storing the image data of the original, which has been read, into an USB memory connected to the USB connector 71.

FIG. 4 is an explanatory view showing the state in which an original 20b is placed on a predetermined position of the original table 20 shown in FIG. 3. A user places the original onto the original table 20 with a portion to be read facing downward. The back left corner of the original table 20 serves as a reference position when the original 20b is placed, and is provided with a corner mark 20a for allowing a user to recognize the reference position.

The original reading unit 23 is circuitry including a linear image sensor in the present embodiment, and the reading direction along a line of the linear image sensor is along a direction (hereinafter referred to as a main scanning direction) indicated by an arrow M in FIG. 4. The scanning unit 21 moves in a direction orthogonal to the main scanning direction, that is, a direction (hereinafter referred to as a sub-scanning direction) indicated by an arrow S in FIG. 4.

Figure 5A:
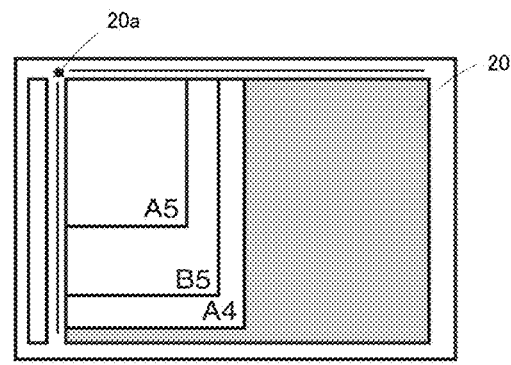
FIG. 5A is an explanatory view showing locations in the case where A5, B5, and A4 originals are longitudinally placed on the original table shown in FIG. 3.
Figure 5B:
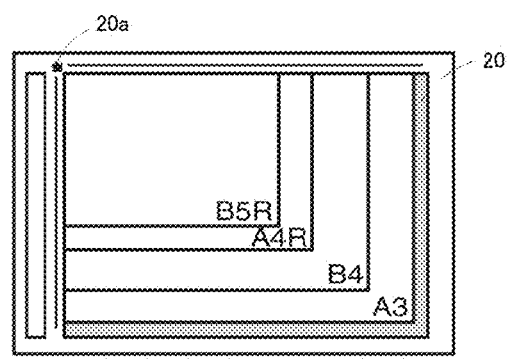
FIG. 5B is an explanatory view showing locations in the case where A5 to A3 originals are horizontally placed on the original table shown in FIG. 3.

FIG. 5A is an explanatory view showing locations when A5, B5, and A4 originals are placed on the original table 20. In this case, a longitudinal direction means a direction in which a short side of a rectangular original extends along the sub-scanning direction. The user places an original in such a way to align the top corner of the original with the corner mark 20a, whatever size it has. Further, FIG. 5B is an explanatory view showing locations when A5 to A3 originals are placed on the original table 20. In this case, a lateral direction means a direction in which a long side of an original extends along the sub-scanning direction. The user places an original in such a way to align the top corner of the original with the corner mark 20a, whatever size it has.

Figure 5C:
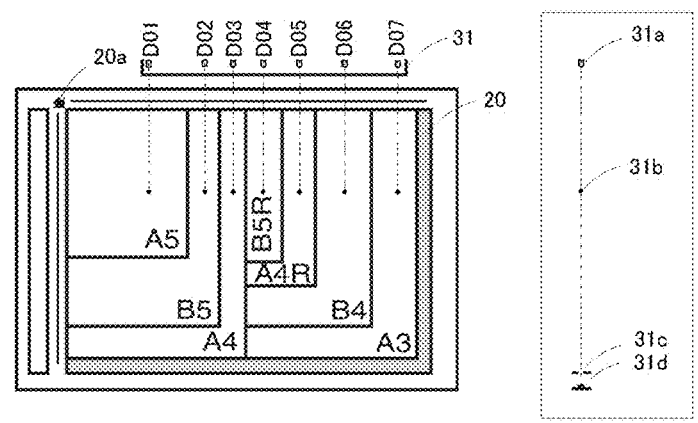
FIG. 5C is an explanatory view showing that, when originals with sizes in AB series are placed on the original table shown in FIG. 3, an original size detection unit detects the sizes thereof.

FIG. 5C is an explanatory view showing the state in which, when originals in AB series are placed on the original table 20, the original size detection unit 31 detects the size of the originals.

The original size detection unit 31 includes seven light-emitting elements D01 to D07 arranged along the sub-scanning direction. Each of the light-emitting elements DO1 to D07 emits light obliquely downward to the near side from top at the far side of the original table 20. The emitted light passes through the original table 20 made of transparent glass from top to bottom. The emitted light then passes through a slit formed below the original table 20 at the near side, and reaches a corresponding light-receiving element.

Seven slits and seven light-receiving elements are arranged along the sub-scanning direction so as to correspond to the light-emitting elements D01 to D07. The arrangement relation of a set of a light-emitting element, a slit, and a light-receiving element as viewed from top is illustrated at the right part in FIG. 5C. This arrangement relation is illustrated as enclosed by a rectangle.

Infrared light is radiated toward the near side with a certain spread from the light-emitting element 31a composed of an infrared light-emitting diode. Out of the infrared light, a beam of infrared light radiated toward the top surface 31b of the original table passes through the original table 20 from the top surface to the bottom surface while refracting, and enters the light-receiving element 31d through the slit 31c formed below the original table 20 at the near side. The slit 31c is formed to block infrared light emitted from the adjacent light-emitting element.

Seven infrared beams emitted from seven light-emitting elements toward the corresponding seven light-receiving elements are illustrated by two-dot-chain lines in FIG. 5C. When an original is placed on the original table 20, infrared beam is blocked by the original at the portion where the original is placed, and thus, the infrared beam does not reach the light-receiving element. In the case where the image reading apparatus 11 is in a stand-by state and the cover opening-and-closing sensor 35 detects the closed state of the original cover 33, the control unit 41 sequentially reads whether or not an infrared beam reaches the seven light-receiving elements in the original size detection unit 31. Each infrared beam detects the presence/absence of an original on a plurality of different locations. The size of an original placed on the original table 20 can be determined by a pattern indicating whether or not each infrared beam reaches the corresponding light-receiving element. Each infrared beam is referred to as a detection beam below in some cases. When the cover opening-and-closing sensor 35 detects the closed state, the control unit 41 stops reading of each infrared beam, and keeps the size of the original based on the last read detection beam. When the cover opening-and-closing sensor 35 detects the open state, the control unit 41 sequentially reads each infrared beam again.

Figure 6A:
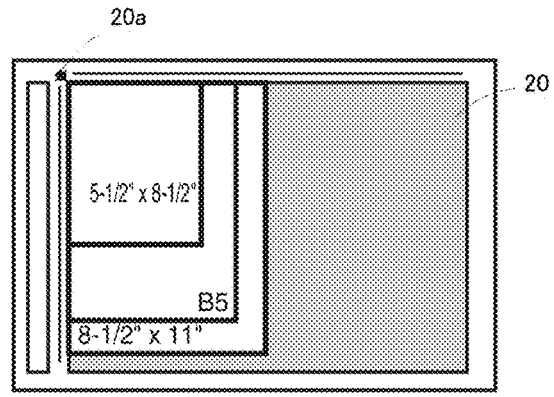
FIG. 6A is an explanatory view showing locations in the case where 5.5"×8.5", B5, and 8.5"×11" originals are longitudinally placed on the original table shown in FIG. 3.
Figure 6B:
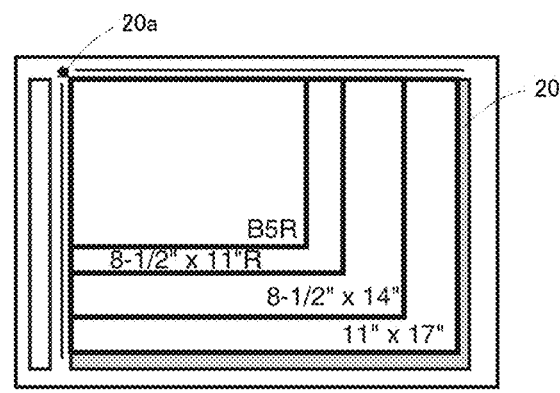
FIG. 6B is an explanatory view showing locations in the case where originals with sizes in inch series and B5 original are horizontally placed on the original table shown in FIG. 3.
Figure 6C:
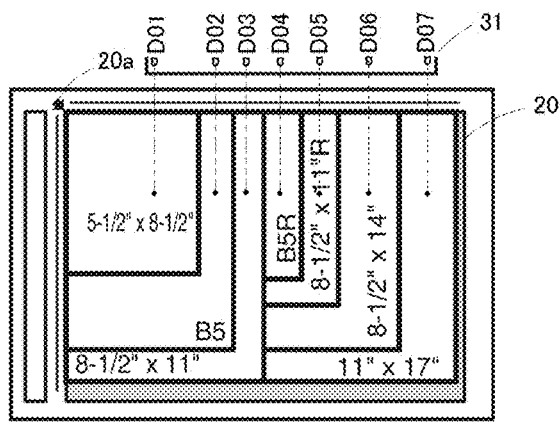
FIG. 6C is an explanatory view showing that, when originals in inch series and B5 original are placed on the original table shown in FIG. 3, an original size detection unit detects the sizes thereof.

FIGS. 5A to 5C show the determination of each size in AB series, and FIGS. 6A to 6C show the determination of B5 size and sizes in inch series corresponding to the sizes in FIGS. 5A to 5C. Notably, which one of a size in AB series and a size in inch series is detected is selectively set according to the situation of a customer using the digital multifunction peripheral 10.

FIG. 7 is an explanatory diagram showing patterns of presence/absence of detection beams corresponding to each size (see FIG. 5C) of an original in AB series. In FIG. 7, items D01 to D07 in the horizontal direction indicate whether or not an infrared beam is detected by the light-receiving element corresponding to the light-emitting element in FIG. 5C. The items in the vertical direction in FIG. 7 indicate sizes. A circle (O) in FIG. 7 indicates that a detection beam reaches a light-receiving element, that is, a detection beam is present. A cross mark (X) in FIG. 7 indicates that a detection beam does not reach a light-receiving element, that is, detection beam is not present.

FIG. 8 is an explanatory diagram showing patterns of presence/absence of detection beams corresponding to each size in inch series and B5 size (see FIG. 6C).

FIG. 9 shows a pattern of presence/absence of detection beams different from any patterns in FIGS. 7 and 8. As described later, when the detection pattern in FIG. 9 which does not correspond to any one of standard size originals is obtained, it may be determined that multiple originals 20 are placed on the original table 20, and a multi-crop scan may be performed.

<<Reading-Area of Original>>

A reading-area from which an image of an original is read by the original reading unit 23 will be described.

The control unit 41 determines a reading area, i.e. an area which should be read by the original reading unit 23 on the basis of an original size detected by the original size detection unit 31. As shown in FIGS. 5A, 5B, 6A, and 6B, the reading-area corresponds to an area where an original is placed on the original table 20.

FIG. 10 is an explanatory view showing a reading-area corresponding to the maximum original size, that is, A3 size and 11"×17" size, shown in FIGS. 5B and 6B respectively. As shown in FIG. 10, an A3 size has an area with a length of 297 mm in the main scanning direction and 420 mm in the sub-scanning direction. A 11"×17" size has an area with a length of 279.4 mm in the main scanning direction and 431.8 mm in the sub-scanning direction. As described above, the 11"×17" size is slightly smaller in the main scanning direction and slightly larger in the sub-scanning direction than the A3 size.

Strictly speaking, a reading-area is determined to be somewhat smaller than an original size so as to form a margin of about 1 to 10 mm around each original. This is to prevent an edge of an original from appearing on the read image as a shadow.

<<Operation Procedure for Reading Standard Size Original>>

Subsequently, one example of an operation for reading an image of an original which has an ordinary standard size and is placed on the original table 20 will be described. While the present invention relates to a multi-crop scan, the example of the operation for reading an ordinary original will be described first, which facilitates understanding of the features of the present invention relating to a multi-crop scan.

FIGS. 11A to 11I are explanatory views showing a display on the operation display unit 51 and an operation procedure required to be performed by a user when the digital multifunction peripheral 10 reads a standard size original.

Figure 11B:
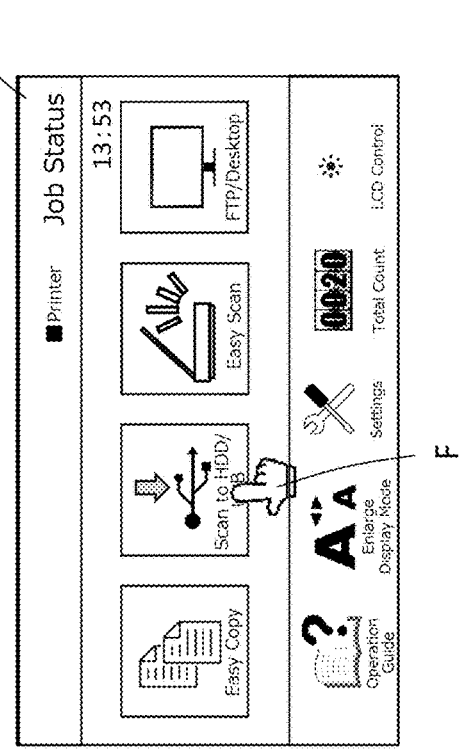
FIG. 11B is a second explanatory view showing the operation procedure of the digital multifunction peripheral shown in FIG. 1 when a standard size original is to be read.
Figure 11A:
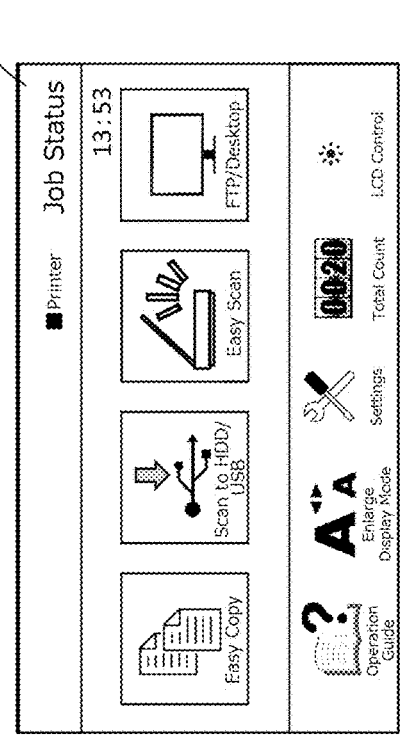
FIG. 11A is a first explanatory view showing an operation procedure of the digital multifunction peripheral shown in FIG. 1 when a standard size original is to be read.

FIG. 11A shows one example of an operation screen displayed on the operation display unit 51 while the image reading apparatus 11 is in a stand-by mode. Operation keys (operation buttons) concerning various functions of the digital multifunction peripheral 10 including the image reading apparatus 11 are displayed on the operation screen. When the user touches these operation keys, he/she can execute various functions. Out of these functions, the case where an original is read and the read image is stored in an USB memory connected to the USB connector 71 will be described as one example of an operation procedure for reading an original.

To read an original and store the image data thereof in the USB memory, the user touches the operation key of "Scan to HDD/USB" on the operation screen shown in FIG. 11A (see FIG. 11B). The fingers illustrated in FIG. 11B indicate the operation of the user touching the operation key of "Scan to HDD/USB" with his/her finger F. In the description below, the user's touch operation on operation keys is similarly indicated by using the illustration of fingers.

Figure 11C:
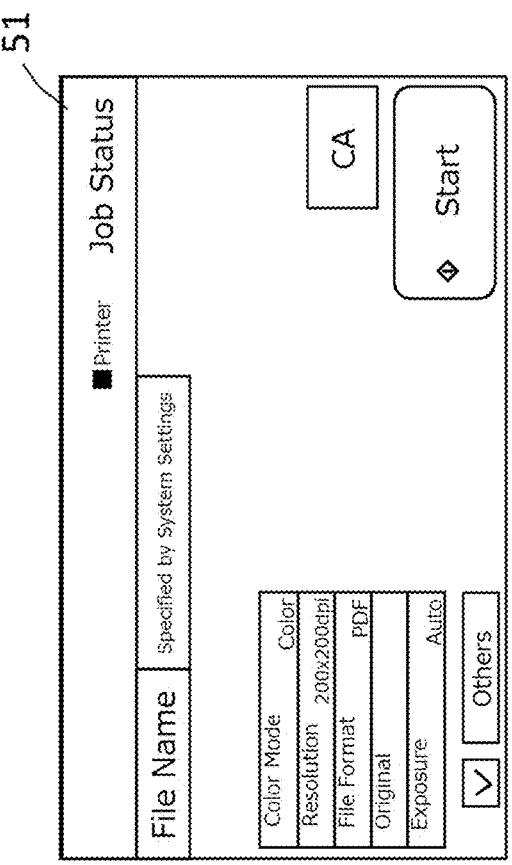
FIG. 11C is a third explanatory view showing the operation procedure of the digital multifunction peripheral shown in FIG. 1 when a standard size original is to be read.

In response to the operation shown in FIG. 11B, the control unit 41 displays the operation screen shown in FIG. 11C on the operation display unit 51. Operation keys concerning the setting of reading, such as "File Name", "Color Mode", "Resolution", "File Format", "Original", and "Exposure", are disposed on the operation screen shown in FIG. 11C. A "CA" key for resetting the setting and a "Start" key for starting the reading operation are also disposed.

The "File Name" is the operation key used by the user to designate a file name of image data to be stored in the USB memory. The "Color Mode" is the operation key for selecting in which one of the modes of color, gray scale, and monochrome the original should be read. The "Resolution" is the operation key for selecting resolution in reading. The "Format" is the operation key for selecting a format of the image data to be output, such as PDF, TIFF, or JPEG. The "Original" is the operation key for designating an original size or a double-side original by a user. The "Exposure" is the operation key for selecting exposure in reading an original. The user can perform settings using these operation keys, as needed.

When the user places a standard size original at a predetermined position on the original table 20, the original size detection unit 31 outputs a detection pattern according to the size of the original by seven detection beams. The control unit 41 determines the size of the original placed on the original table 20 on the basis of the detection pattern.

When the user touches the "Start" key on the operation screen shown in FIG. 11C (see FIG. 11D), the control unit 41 starts the reading operation of the original in response to this operation. The control unit 41 determines a reading-area according to the original size and reads the original by controlling the scanning unit 21 and the original reading unit 23. The control unit 41 also displays a message of "Scanning original. (Pg. No. 1)" and an operation key of "Cancel Scan" on the operation display unit 51 during the reading. The "(Pg. No. 1)" in the message indicates that the first page is currently read.

Figure 11E:
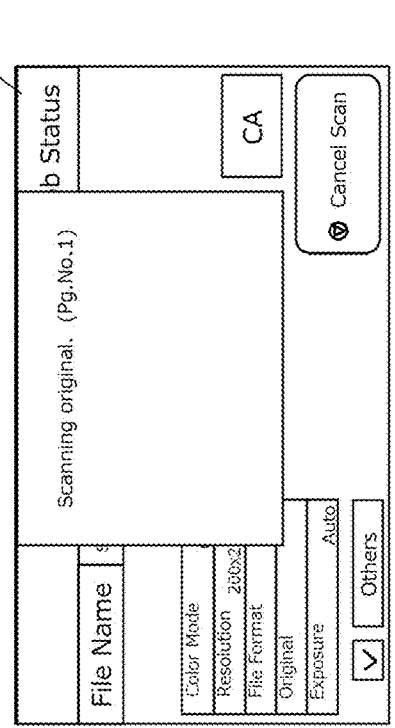
FIG. 11E is a fifth explanatory view showing the operation procedure of the digital multifunction peripheral shown in FIG. 1 when a standard size original is to be read.
Figure 11D:
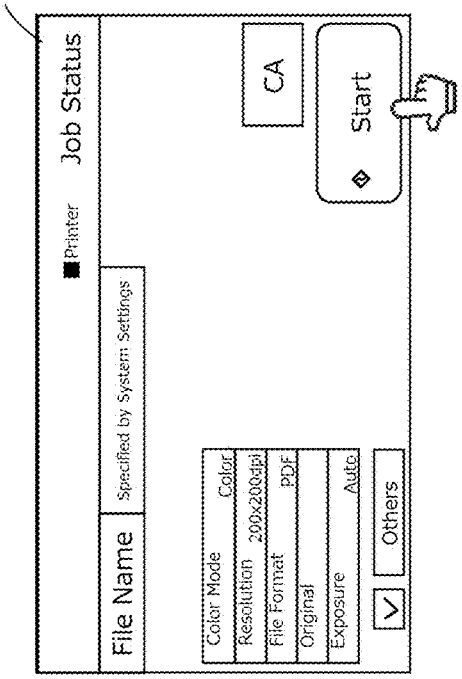
FIG. 11D is a fourth explanatory view showing the operation procedure of the digital multifunction peripheral shown in FIG. 1 when a standard size original is to be read.
Figure 11G:
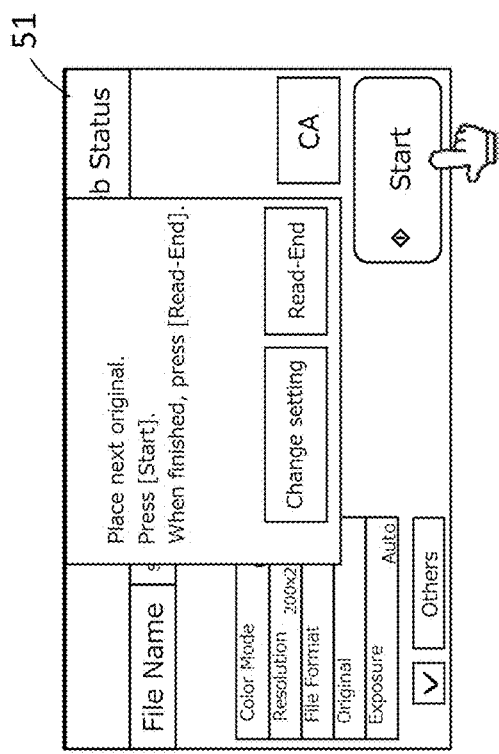
FIG. 11G is a seventh explanatory view showing the operation procedure of the digital multifunction peripheral shown in FIG. 1 when a standard size original is to be read.
Figure 11F:
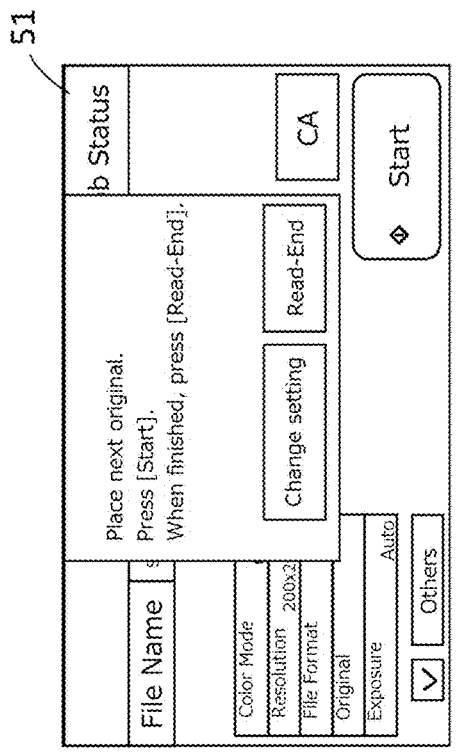
FIG. 11F is a sixth explanatory view showing the operation procedure of the digital multifunction peripheral shown in FIG. 1 when a standard size original is to be read.
Figure 11I:
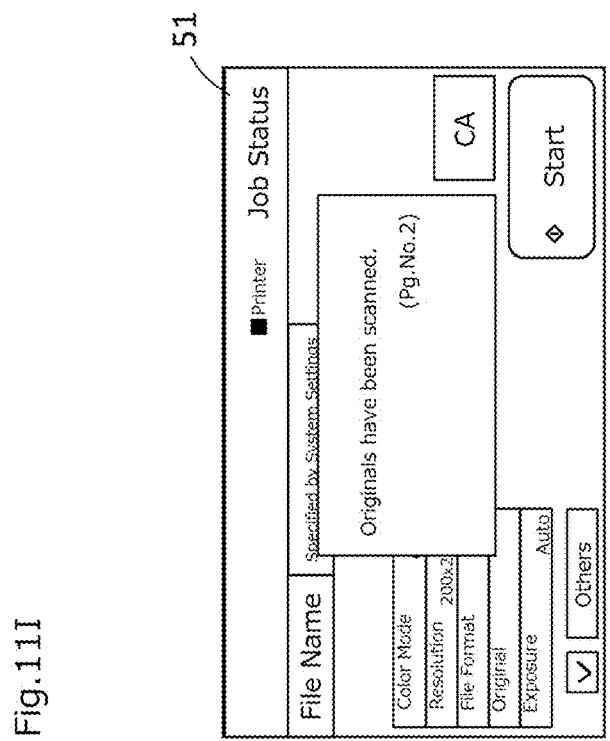
FIG. 11I is a ninth explanatory view showing the operation procedure of the digital multifunction peripheral shown in FIG. 1 when a standard size original is to be read.

When the reading of the first original is finished, the control unit 41 then displays, on the operation display unit 51, a screen for asking the user to select whether to end the reading, to change the setting for the next reading, or to start the next reading, as shown in FIG. 11F.

When the user then opens the original cover 33 and places the next original on the original table 20, the original size detection unit 31 outputs a pattern of detection beams according to the size of the original which is newly set. When the user presses the "Start" key with this state (see FIG. 11G), the control unit 41 starts the reading of the next original in response to this operation. The control unit 41 causes the image reading unit 23 to read the original in the reading-area determined based on the original size. While reading, the control unit 41 displays the message of "Scanning original." on the operation display unit 51 as in FIG. 11E. However, during the second reading, "Pg. No. 2" is displayed in place of "Pg. No. 1" in FIG. 11E to notify the user that this is the second reading.

When the reading of the second original is finished, the control unit 41 then displays the screen same as that in FIG. 11F on the operation display unit 51 to ask the user to select whether to end the reading, to change the setting for the next reading, or to start the next reading.

When the user touches the operation key of "Read-End" (see FIG. 11H), the control unit 41 stores the image data of the two originals, which have been read, into the USB memory connected to the USB connector 71. After the writing on the USB memory is finished, the control unit 41 displays a message of "Originals have been scanned. (Pg. No. 2)" on the operation display unit 51 (see FIG. 11I).

Figure 12:
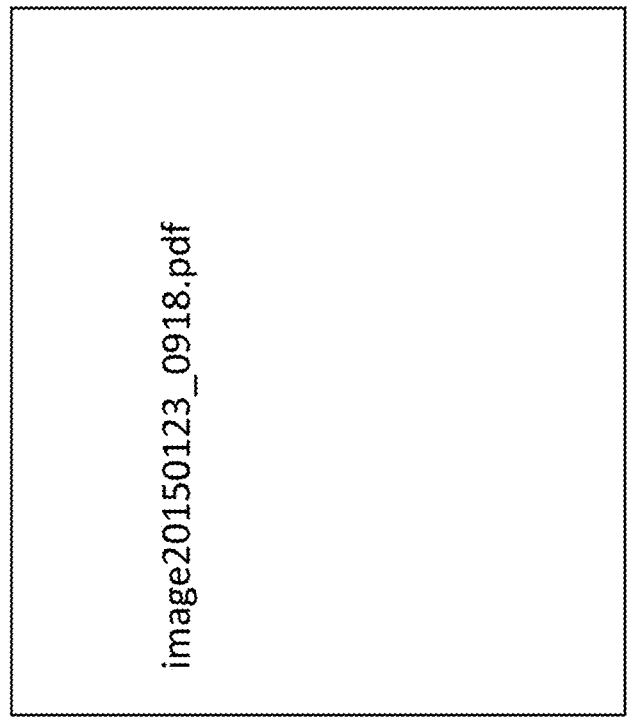
FIG. 12 is an explanatory view showing the state in which image data of the standard size original, which has been read, is stored in an USB memory connected to the digital multifunction peripheral shown in FIG. 1.

As shown in FIG. 12, the image output unit 27 stores a PDF file formed by combining two pages of the read original into one file into the USB memory. The file name includes information of date and time at which the originals are scanned and read. That is, the part "20150123" in the file name of "image20150123_0918.pdf" shown in FIG. 12 indicates the date of Jan. 23, 2015. The part "0918" subsequent to the date indicates the time of 9:18.

<<Operation Procedure for Reading Standard Size Original>>

The above-mentioned process in which the control unit 41 executes reading of an original will comprehensively be described.

Figure 13:
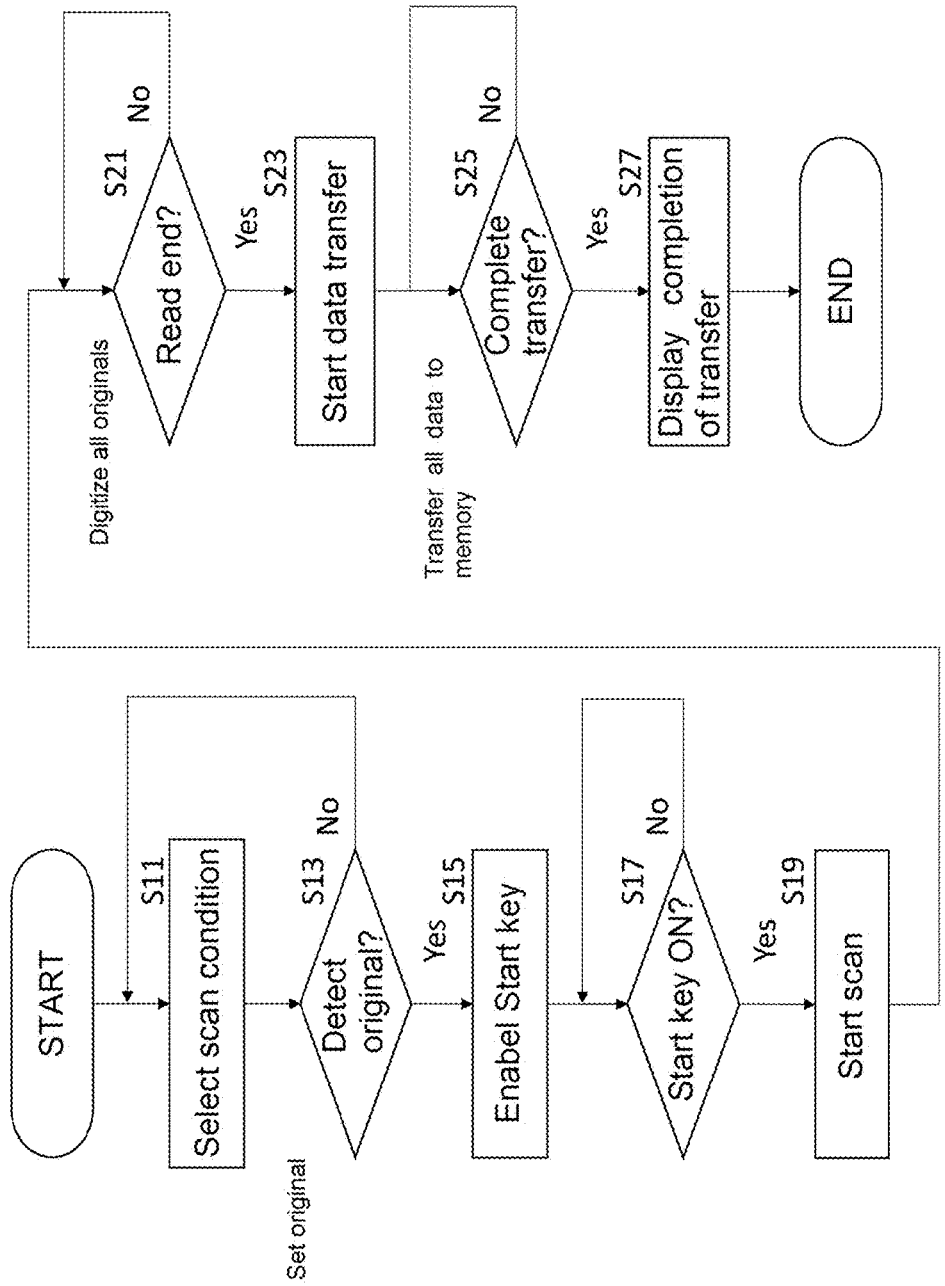
FIG. 13 is a flowchart showing a process executed by a control unit when the digital multifunction peripheral according to the present invention reads a standard size original.

FIG. 13 is a flowchart showing the process executed by the control unit when the digital multifunction peripheral 10 reads a standard size original. Although the digital multifunction peripheral 10 simultaneously performs other processes (for example, an image forming process) in some cases, the description of such processes will be omitted. As shown in FIG. 13, the control unit 41 displays a screen for allowing a user to select the original reading condition on the operation display unit 51 (step S11, corresponding to FIGS. 11A to 11C), and waits until the original size detection unit 31 detects an original placed on the original table 20 (step S13).

After the original size detection unit 31 detects that an original is placed on the original table 20 and the size of this original (Yes in step S13), the control unit 41 validates the reception of an operation on the "Start" key displayed on the operation display unit 51 (step S15). Then, the control unit 41 waits until the "Start" key is pressed (step S17).

After the "Start" key is pressed (Yes in step S17, corresponding to FIG. 11D), the control unit 41 determines a reading-area of the original, and starts scanning and reading of the original (step S19, corresponding to FIG. 11E). Every time a single original is scanned, the control unit 41 asks the user to select whether to perform the next reading or end the reading (step S21, corresponding to FIG. 11F). When the "Start" key is pressed, the control unit 41 performs next reading (loop of No in step S21, corresponding to FIG. 11G).

Figure 11H:
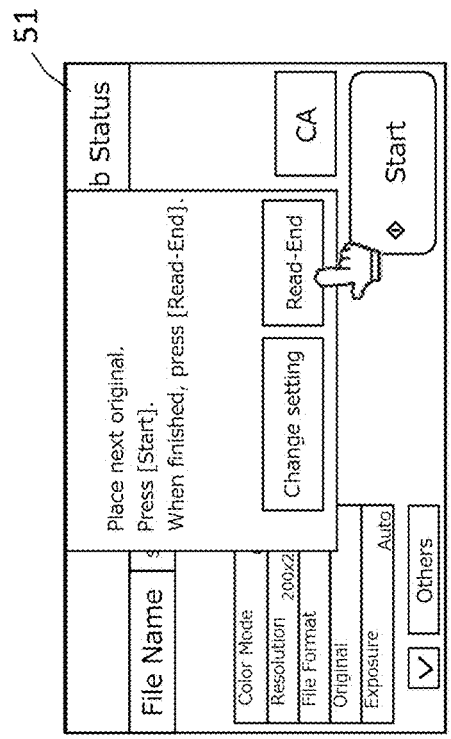
FIG. 11H is an eighth explanatory view showing the operation procedure of the digital multifunction peripheral shown in FIG. 1 when a standard size original is to be read.

On the other hand, when the "Read-End" key is pressed, the control unit 41 ends the reading (Yes in step S21, corresponding to FIG. 11H).

Then, the control unit 41 starts the transfer of the image data of the original, which has been read, into the memory (step S23). In the present embodiment, the image data is transferred to the USB memory connected to the USB connector 71 through the image output unit 27. However, this is only one example. In the case where the copying function is selected, the image data is transferred to the image forming apparatus 12 through the image output unit 27. Note that the image data may temporarily be stored in the storage unit 43 as a buffer. In the case where the scanner function is selected, the image data may be transmitted to an external device connected to a network through the communication unit 45. In the case where the image filing function is selected, the image data is transferred to the storage unit 43 and stored therein. In the case where the facsimile function is selected, the image data is transmitted through the communication unit 45 and a public line.

After the transfer of the image data is completed (Yes in step S25), the control unit 41 notifies the user of the completion of the transfer (step S27, corresponding to FIG. 11I), and then, ends the process.

<<Operation Procedure of Multi-Crop Scan>>

Next, an operation procedure of a multi-crop scan according to the present embodiment will be described.

FIGS. 14A to 14F, 15, and 16A to 16C are explanatory views showing the operation procedure when the digital multifunction peripheral 10 performs a single multi-crop scan.

Figure 14A:
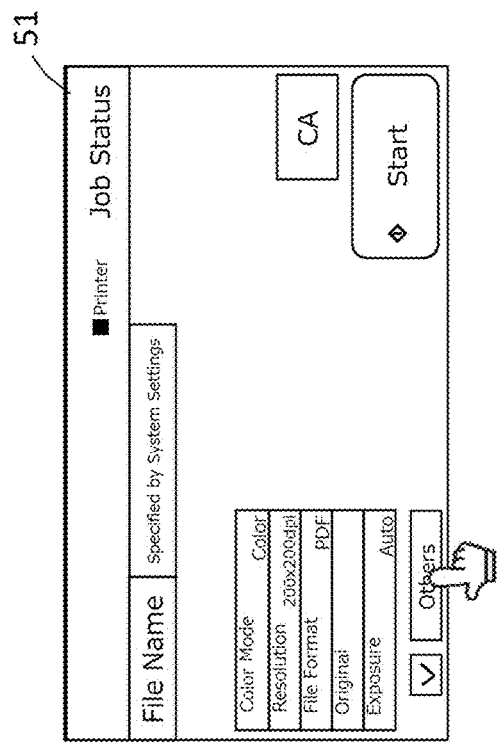
FIG. 14A is a first explanatory view showing an operation procedure of the digital multifunction peripheral shown in FIG. 1 when a single multi-crop scan is executed.
Figure 14B:
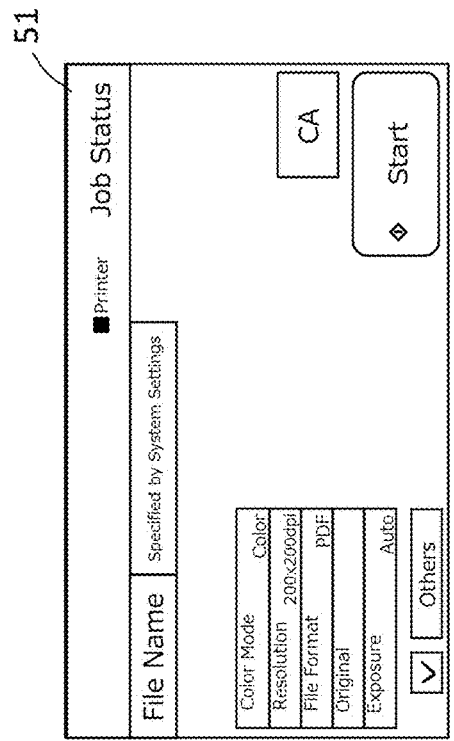
FIG. 14B is a second explanatory view showing the operation procedure of the digital multifunction peripheral shown in FIG. 1 when a single multi-crop scan is executed.
Figures 14C, 14D:
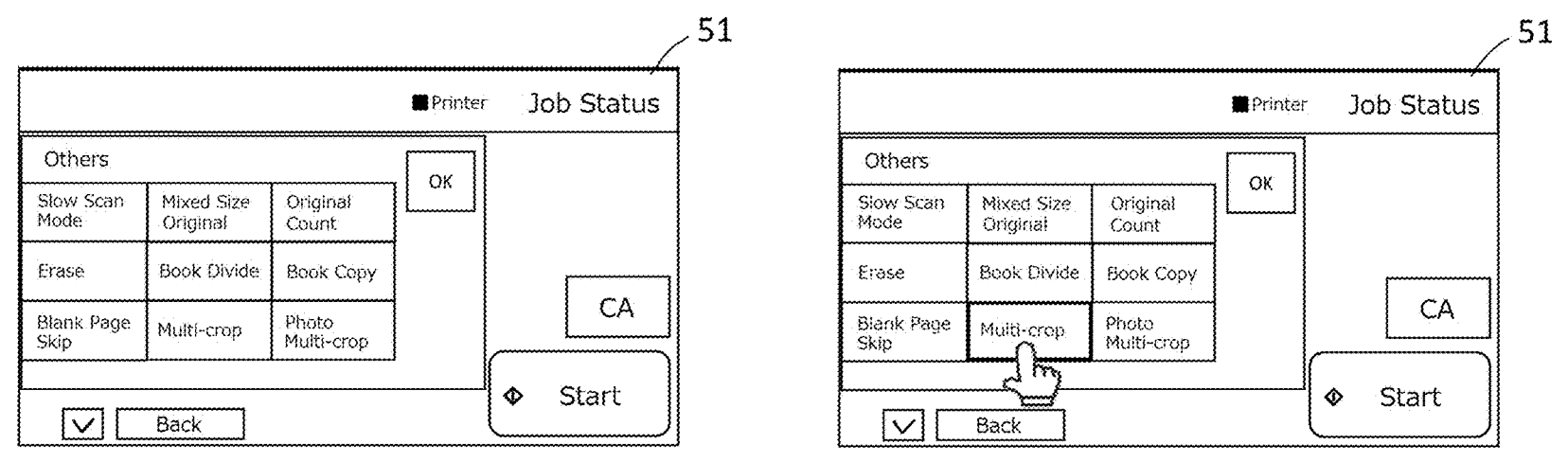
Figure 14E:
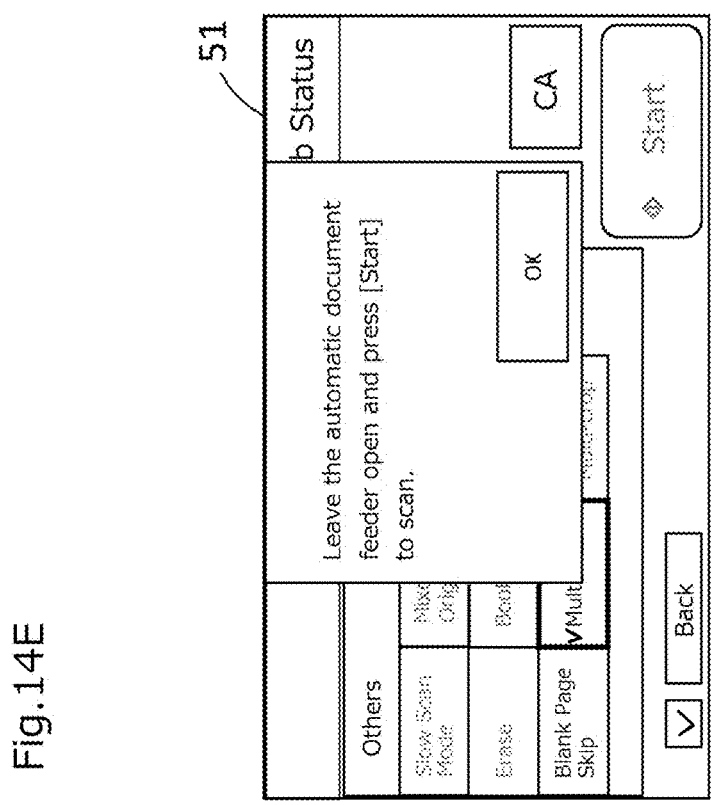
FIG. 14E is a fifth explanatory view showing the operation procedure of the digital multifunction peripheral shown in FIG. 1 when a single multi-crop scan is executed.

When performing the multi-crop scan, the digital multifunction peripheral 10 which has been in the stand-by mode reaches the screen in FIG. 14A which is similar to the screen in FIG. 11C through the operation screen in FIG. 11A and the operation screen in FIG. 11B. When the user touches an "Others" key on the screen in FIG. 14A (see FIG. 14B), the control unit 41 displays the screen in FIG. 14C on the operation display unit 51 in response to this operation. A "Multi-crop" key is displayed as one of other functions on the screen in FIG. 14C. Note that a "Photo Multi-crop" key which also relates to the present embodiment will be described later, and the "Multi-crop" will firstly be described. Note that, in the present specification, the "Photo Multi-crop" is also referred to as "inversion multi-crop". On the other hand, ordinary multi-crop is also referred to as "non-inversion multi-crop".

When the user presses the "Multi-crop" key (see FIG. 14D), the control unit 41 displays a check mark indicating that the "Multi-crop" is selected on the "Multi-crop" key in response to the operation in FIG. 14D. Then, the control unit 41 displays the message of "Leave the automatic document feeder open and press [Start] to scan." along with an "OK" key on the operation display unit 51 (see FIG. 14E). When a standard size original is to be read, the original cover 33, that is, the automatic document feeder in the above message, is closed in principle. However, in the multi-crop scan, the original is scanned with the original cover being left open in order that the area outside of the original is read as black with respect to the white or light tone base of the original. The cropping unit 25 recognizes the border of each original on the basis of the contrast between the light tone base of the original and the black color of the area outside of the original, and performs cropping.

When the user reads the message of "Leave the automatic document feeder open and press [Start] to scan." and presses the "OK" key (see FIG. 14F), the control unit 41 erases the message in response to this operation.

The user arranges multiple originals, which are the objects for the multi-crop scan, on the original table 20.

Figure 15:
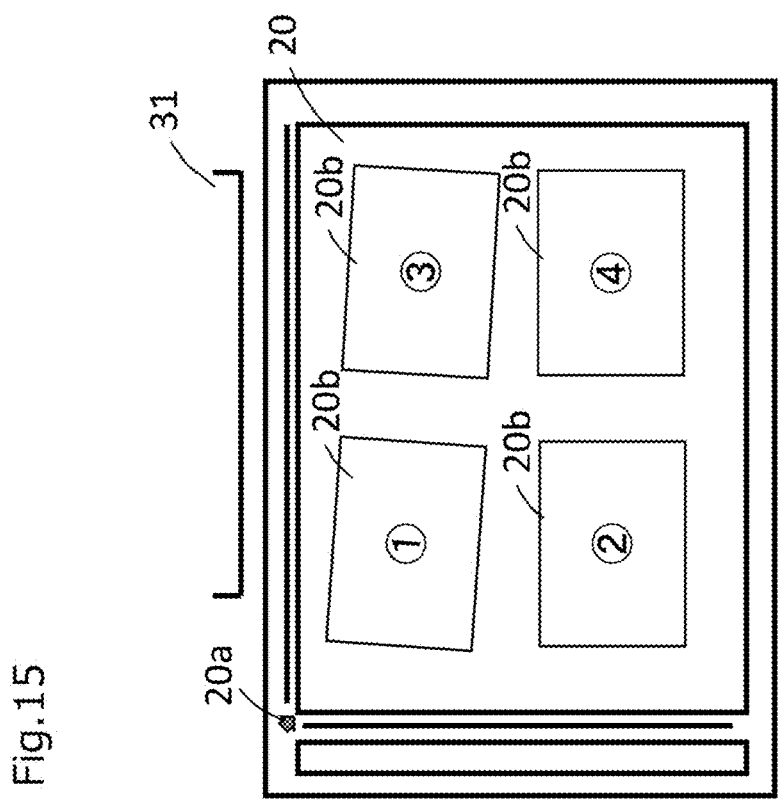
FIG. 15 is an explanatory view showing the state in which multiple originals for a multi-crop scan are placed on the original table shown in FIG. 3.
Figure 16C:
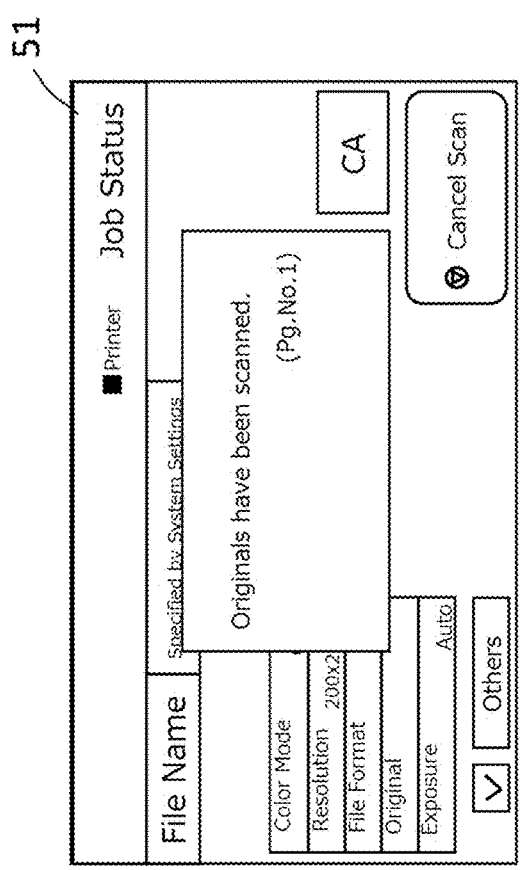
FIG. 16C is a ninth explanatory view showing the operation procedure of the digital multifunction peripheral shown in FIG. 1 when a single multi-crop scan is executed.

FIG. 15 is an explanatory view showing the state in which four originals 20b for the multi-crop scan are placed on the original table 20. The reference numerals 1 to 4 attached to the respective originals indicate one example of the cropping order, and these reference numerals correspond to serial numbers in filenames described later.

When the user presses the "Start" key with the original cover 33 being left open (see FIG. 16A), the control unit 41 determines the maximum area for the multi-crop scan as a reading-area and causes the scanning unit 21 and the original reading unit 23 to scan and read the four originals 20b in batch, in response to the operation in FIG. 16A. While reading, the control unit 41 displays a message of "Scanning original. (Pg. No. 1)" and an operation key of "Cancel Scan" on the operation display unit 51 as shown in FIG. 16B. The "Pg. No. 1" in the message indicates that the first batch scan is currently executed.

Notably, the control unit 41 can acquire the open state and closed state of the original cover 33 by the cover opening-and-closing sensor 35. Therefore, when the original cover 33 is closed, the control unit 41 may invalidate the "Start" key to inhibit the start of the batch scan (first embodiment).

Alternatively, when the original cover 33 is closed, the control unit 41 may display a message encouraging the user to open the original cover 33 on the operation display unit 51 (second embodiment).

Further, when the "Start" key is pressed with the original cover 33 being closed, the control unit 41 may inhibit the start of the batch scan, and at that time, display a message, which encourages the user to open the original cover 33 and again press the "Start" key, on the operation display unit 51 (third embodiment).

<<Reading-Area for Multi-Crop Scan>>

A reading-area of a standard size original is determined by the control unit 41 on the basis of the original size detected by the original size detection unit 31. However, when multiple originals 20b are placed on the original table 20 with a space therebetween as shown in FIG. 15, the original size detection unit 31 in the present embodiment is unable to precisely detect the size of each original.

In view of this, when the multi-crop scan is selected by the touch on the "Multi-crop" key, the control unit 41 performs the control to disregard the original size detected by the original size detection unit 31 and to read the maximum area readable by the scanning unit 21 and the image reading unit 23. Specifically, the control unit 41 determines the maximum readable area as a reading-area, regardless of the detection by the original size detection unit 31.

For example, in the present embodiment, the maximum original size in AB series is A3 which has 297 mm in the main scanning direction and 420 mm in the sub-scanning direction as shown in FIG. 10. This can be said to be the readable maximum area. More specifically, in the case where a margin of 10 mm is formed around an original, the reading-area has 277 mm, which is smaller than 297 mm by 20 mm in total at both ends, in the main scanning direction and 400 mm, which is smaller than 420 mm by 20 mm in total at both ends, in the sub-scanning direction. An image in the margin is not read.

However, the margin is formed to prevent the edge of the standard size original from being read, and when the multi-crop scan is performed to multiple originals arranged as shown in FIG. 15, there is no point in forming a margin. Therefore, when the multi-crop scan is selected, not the reading-area for A3 size but the area for A3 size with no margin, that is, the area having 297 mm in the main scanning direction and 420 mm in the sub-scanning direction, may be determined as a reading-area. In this way, the control unit 41 determines, as a reading-area for the multi-crop scan, an area larger than a reading-area in reading a standard size original of A3 size which is the maximum original size detectable by the original size detection unit (fourth embodiment).

Alternatively, in the case where the multi-crop is selected, the digital multifunction peripheral 10, which selectively sets a size of a standard size original in AB series and inch series, may set 297 mm which corresponds to A3 size and is larger than 11"=279.4 mm that is the maximum original size in inch series, as a reading-area in the main scanning direction. On the other hand, in the sub-scanning direction, 17"=431.8 mm which is the maximum original size in inch series larger than 420 mm of A3 size which is the maximum original size in AB series may be set as a reading-area. In such way, the control unit 41 may determine an area larger than the reading-area of an A3 size which is the maximum original size as a reading-area for the multi-crop scan (fifth embodiment).

Alternatively, if an area larger than the above-mentioned area can be read in either one or both of the main scanning direction and the sub-scanning direction, the maximum area thereof may be employed as a reading-area when the multi-crop is selected. In such way, the control unit 41 may determine an area larger than the reading-area of an A3 size which is the maximum original size as a reading-area for the multi-crop scan (sixth embodiment).

<<Cropping Process of Original>>

When the multi-crop is selected, the cropping unit 25 crops an image of each original from the image of multiple originals which have been scanned in batch. In this case, the edge, that is, the border between the original and the area outside of the original, may be determined, supposing that the original has a rectangular shape. The cropping unit 25 recognizes the border of each original on the basis of the contrast between a light tone base of the original and black color of the area outside of the original and crops the image of each original. Therefore, it is premised that there are no characters and images on the edge of the original, and the edge of the original has a light tone base. However, even if this premise is not locally established, an area of each original can precisely be cropped on the basis of the premise that the original has a rectangular shape.

From another point of view, if the premise that the edge of the original has a light tone base at any positions is established, the area of each original can precisely be cropped without presupposing that the original has a rectangular shape.

<<Output of Image Data>>

After the batch scan is finished, the control unit 41 stores the image data of four originals which have been read by the batch scan and cropped by the cropping unit 25 into the USB memory connected to the USB connector 71. After finishing the writing to the USB memory, the control unit 41 displays a message of "Originals have been scanned. (Pg. No. 1)" on the operation display unit 51 (see FIG. 16C).

Notably, while the "multi-crop" is a function of performing a batch scan only once (this function is referred to as single multi-crop in the present specification) in the present embodiment, a function of performing a batch scan more than once (this function is referred to as continuous multi-crop in the present specification) can be selected by another operation.

Figure 17B:
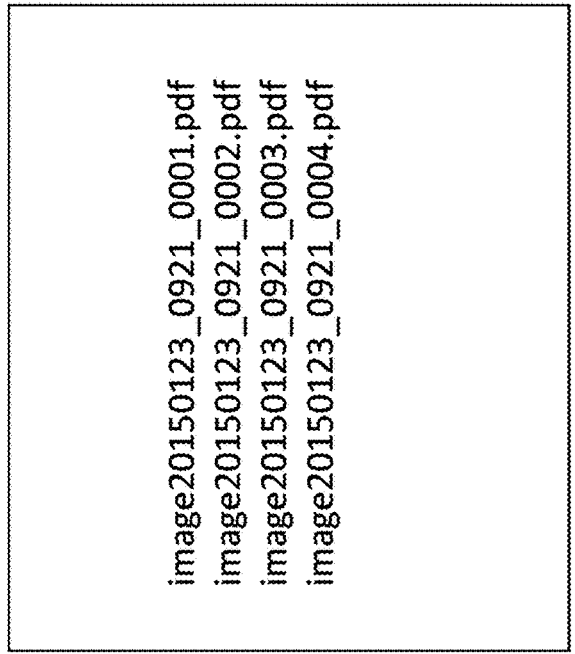
FIG. 17B is an explanatory view showing another embodiment in which image data of the original which has been read by the single multi-crop scan is stored in an USB memory connected to the digital multifunction peripheral shown in FIG. 1.
Figure 17A:
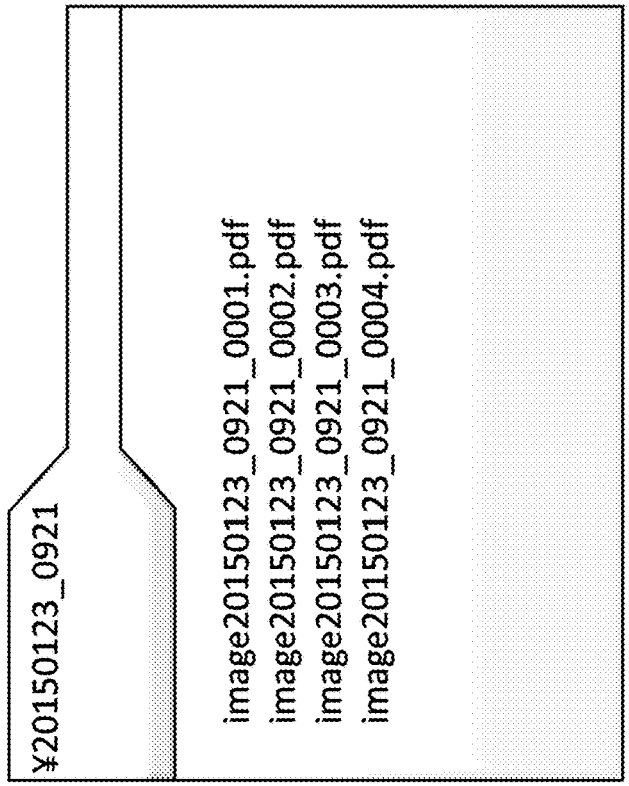
FIG. 17A is an explanatory view showing the state in which image data of the original which has been read by the single multi-crop scan is stored in an USB memory connected to the digital multifunction peripheral shown in FIG. 1.

As shown in FIG. 17A, the image data corresponding to the cropped four originals is stored in the USB memory as four files stored in one folder. This folder is newly created when the files are stored in the USB memory. The filename attached to each of the four files includes information of the date and time at which the originals are scanned in batch. The filename also includes information indicating the relation among four files. The first filename "image20150123_0921_0001.pdf" out of four files shown in FIG. 17A will be described. The part "20150123" indicates the date of Jan. 23, 2015, and the subsequent part "0921" indicates the time of 9:21. Since the four files have been read by the batch scan, they have the information of the same date and time. The files also include serial numbers of 0001 to 0004 indicating the relation thereof at the end of the filename of each file. Due to the serial number attached to each filename, the user can easily recognize that the image data is a series of image data.

In addition, the name of the folder storing these files includes the information of the date and time at which the originals are scanned in batch (seventh embodiment).

FIG. 17B is an explanatory view showing an embodiment different from FIG. 17A. In FIG. 17A, the image data of each original cropped through a batch scan is stored in a newly-created folder. On the other hand, in FIG. 17B, each file is stored without creating a folder. Note that the filenames of four image data pieces include information of the date and time at which the originals are scanned in batch, as in FIG. 17A. The filenames also include serial numbers as information indicating the relation of four files. Only from the filenames, the relation of four files is recognized, since the filenames include the same date and same time (eighth embodiment).

The serial number attached at the end of each file in FIGS. 17A and 17B is merely one example of the information indicating relation. The information indicating relation may be other than the serial number, such as an alphabet. The position where this information is attached is not limited to the end of the filename. For example, this information may be attached in the middle of the filename, such as before or after the date information.

As still another embodiment, image data may be stored as being associated with one another in a known linked list to enable a user to recognize the relation of a series of image data (ninth embodiment). The format is not limited to a linked list, and any format is applicable, so long as multiple files can be stored in association with one another.

Further, in FIG. 17A, the folder name and the filename have the information of the same date and same time, which is somewhat redundant. For example, the date information or time information which is also included in the folder name or both of them may be eliminated from the filename.

The present embodiment describes, as one example, the case in which image data is stored in an USB memory. However, there can be other embodiments. For example, in the case where image data is transmitted to an external device connected through a network and stored therein, a filename similar to the above may be attached, a folder may newly be created, and the image data may be stored in the folder, as in FIG. 17A. Alternatively, the image data may be stored without creating a folder as in FIG. 17B.

<<Operation Procedure of Reading Original by Multi-Crop Scan>>

The process in which the control unit 41 executes the above-mentioned multi-crop scan will comprehensively be described.

FIG. 18 is a flowchart showing the process executed by the control unit when the multi-crop is selected. As shown in FIG. 18, the control unit 41 displays a screen for allowing a user to select the scanning condition and multi-crop on the operation display unit 51 (step S31, corresponding to FIGS. 14A to 14D). Then, the control unit 41 requests the user to leave the original cover open (corresponding to FIGS. 14E to 14F). The control unit 41 then waits until multiple originals are arranged on the original table 20 (step S33, corresponding to FIG. 15) and the "Start" key is pressed (step S35).

Although the original size detection unit 31 cannot precisely detect the sizes of the originals arranged on the original table 20, it can detect whether or not the originals are placed on the original table 20.

When the "Start" key is pressed (Yes in step S35, corresponding to FIG. 16A), the control unit 41 determines the maximum readable area as a reading-area (step S37), and then, starts scanning and reading of the originals (step S39, corresponding to FIG. 16B). After finishing the reading (Yes in step S41), the control unit 41 controls such that the cropping unit 25 crops the image data of each original (step S43).

Then, the control unit 41 starts the transfer of the image data of the originals, which have been read, to a memory (step S45). In the present embodiment, the image data is transferred to a USB memory connected to the USB connector 71. However, this is merely one example. In the multi-crop scan, if the copying function is selected, the image data is transferred to the image forming apparatus 12 through the image output unit 27, as in the case of a standard size original. In the case where the scanner function is selected, the image data may be transmitted to an external device connected to a network through the communication unit 45. In the case where the image filing function is selected, the image data is transferred to the storage unit 43 and stored therein. In the case where the facsimile function is selected, the image data is transmitted through the communication unit 45 and a public line.

After the transfer of the image data is completed (Yes in step S45), the control unit notifies the user of the completion of the transfer (step S47, corresponding to FIG. 16C), and then, ends the process.

<<Function of Original Size Detection Unit in Multi-Crop Scan>>

The original size detection unit 31 is supposed to detect a standard size original. Therefore, when multiple originals are arranged for the multi-crop scan, the original size detection unit 31 is unable to precisely detect the size of each original.

Figure 19A:
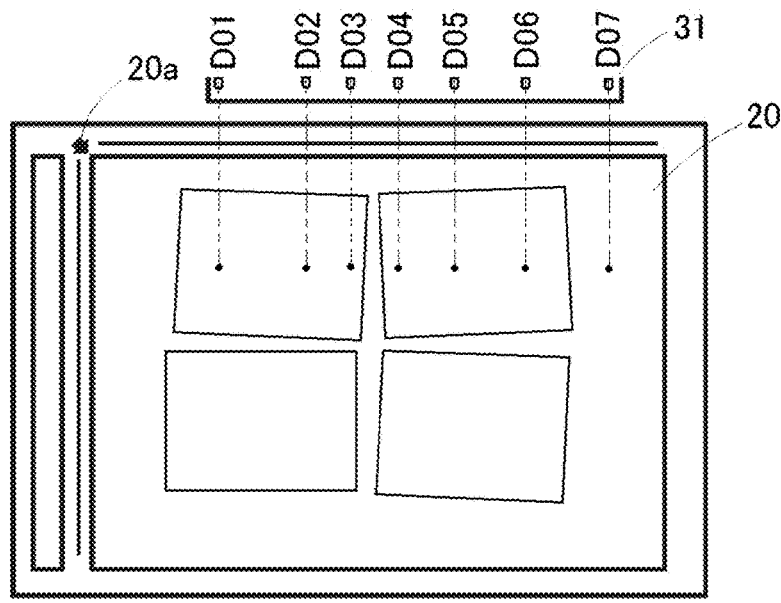
FIG. 19A is an explanatory view showing one embodiment in which the original size detection unit according to the present invention detects multiple originals placed on the original table.

FIG. 19A is an explanatory view showing one embodiment in which the original size detection unit 31 detects multiple originals placed on the original table 20.

Figure 19B:
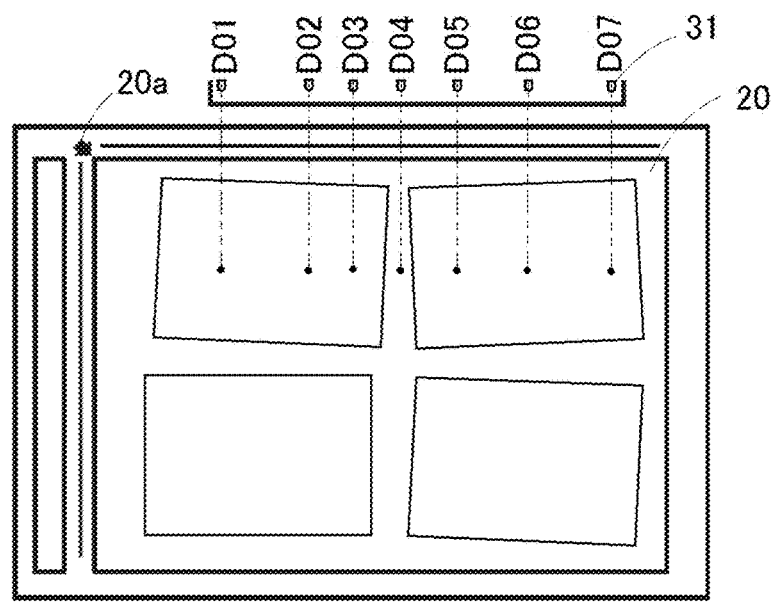
FIG. 19B is an explanatory view showing another embodiment in which the original size detection unit according to the present invention detects multiple originals placed on the original table (corresponding to FIG. 9)
Figure 20B:
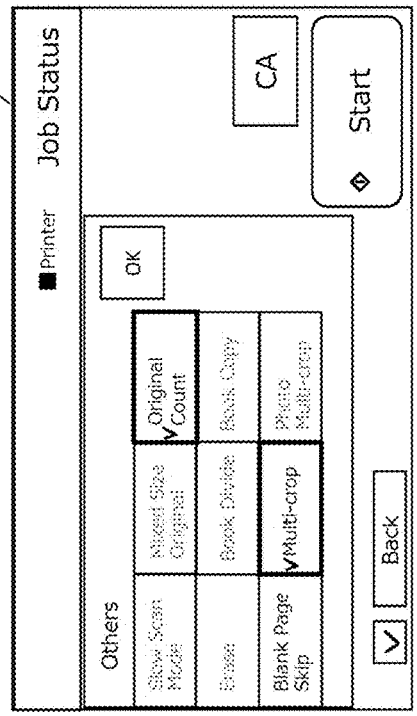
FIG. 20B is a second explanatory view showing the operation procedure of the digital multifunction peripheral shown in FIG. 1 when a continuous multi-crop scan is executed.
Figure 20A:
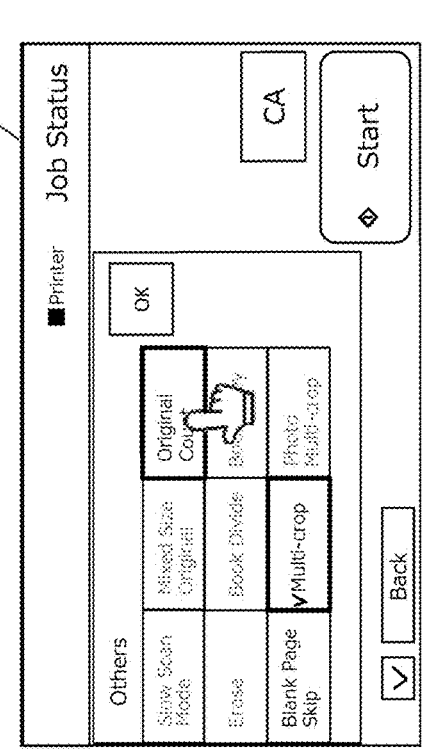
FIG. 20A is a first explanatory view showing an operation procedure of the digital multifunction peripheral shown in FIG. 1 when a continuous multi-crop scan is executed.

FIG. 19B is an explanatory view showing an embodiment different from the embodiment in FIG. 19A.

In FIG. 19A, the original size detection unit 31 outputs detection beams in a pattern same as that for a B4 size in FIG. 7. However, the sizes of the originals placed on the original table 20 are different from B4 size. Further, the pattern of the detection beams corresponding to FIG. 19B (FIG. 9 illustrates the pattern of the detection beams corresponding to FIG. 19B) is different from any of the patterns illustrated in FIG. 7.

In the embodiment described above, since the multi-crop is selected, the control unit 41 determines the maximum readable area as a reading-area, regardless of the detection beams obtained by the original size detection unit 31.

As a modification, when the pattern of detection beams corresponding to a B4 size is obtained as illustrated in FIG. 19A, the control unit 41 may determine an A3 size which is somewhat larger than the B4 size as a reading-area for the multi-crop scan. Specifically, the control unit 41 determines a reading-area corresponding to an original size at least somewhat larger than the original size detected by the original size detection unit 31 as a reading-area by a batch scan. This configuration enables the area where the originals are arranged to be determined as a reading-area and prevents unnecessary scan of an area having no originals (tenth embodiment).

As another modification, when a pattern of detection beams which can never be obtained from a standard size original is obtained as shown in FIG. 19B, the control unit 41 may perform the multi-crop scan. Particularly, this is the case where the beam from the light-emitting element D04 is detected but the beams (from D05 to D07) for the size larger than that are not detected in FIG. 19B, for example. In such case, the control unit 41 may determine that multiple originals are arranged on the original table 20, and perform the multi-crop scan. Specifically, the control unit 41 performs the multi-crop scan in the case where the detection pattern by the original size detection unit 31 corresponds to none of predetermined patterns for a standard size original. Alternatively, the control unit 41 may display a message for asking a user whether to execute the multi-crop scan on the operation display unit 51 (eleventh embodiment).

In the multi-crop scan, the original size detection unit 31 is unable to precisely detect the size of an original, but can detect whether or not an original is placed on the original table 20. Therefore, if the pattern of detection beams shows that there is no original on the original table 20, the control unit 41 may invalidate the "Start" key to prevent the start of the multi-crop scan even if the "Start" key is pressed.

<<Embodiment of Performing Batch Scan More than Once>>

FIGS. 20A, 20B, 21, 22A to 22C, 23, and 24A to 24E show an operation procedure for reading originals by a batch scan performed more than once by the continuous multi-crop scan of the digital multifunction peripheral 10.

When the continuous multi-crop scan is to be executed in the present embodiment, the "Multi-crop" is selected through the screens shown in FIGS. 11A, 11B, and 14A to 14F from the stand-by state. Note that, in this stage, the single multi-crop is selected. When the user then touches an "Original count" key on the screen shown in FIG. 20A, the control unit 41 recognizes that the continuous multi-crop is selected in response to this operation. Then, the control unit 41 displays a check mark on the "Original count" key to inform the user of the selection of the multi-crop including an original count, that is, the selection of the continuous multi-crop (see FIG. 20B).

In other words, the "Multi-crop" key receives the selection of the single multi-crop process, while the "Original count" key receives the selection of the continuous multi-crop process. In the present embodiment, the continuous multi-crop is selected in combination of the "Multi-crop" key and the "Original count" key. However, in another embodiment, a "single multi-crop" key and a "continuous multi-crop key" may be prepared as different operation keys, and either one of them may be selected.

The user arranges multiple originals which are the objects for the multi-crop scan on the original table 20.

FIG. 21 is an explanatory view illustrating the state in which four (1 to 4) originals 20b are placed on the original table 20 for the multi-crop scan as in FIG. 15.

Figure 22A:
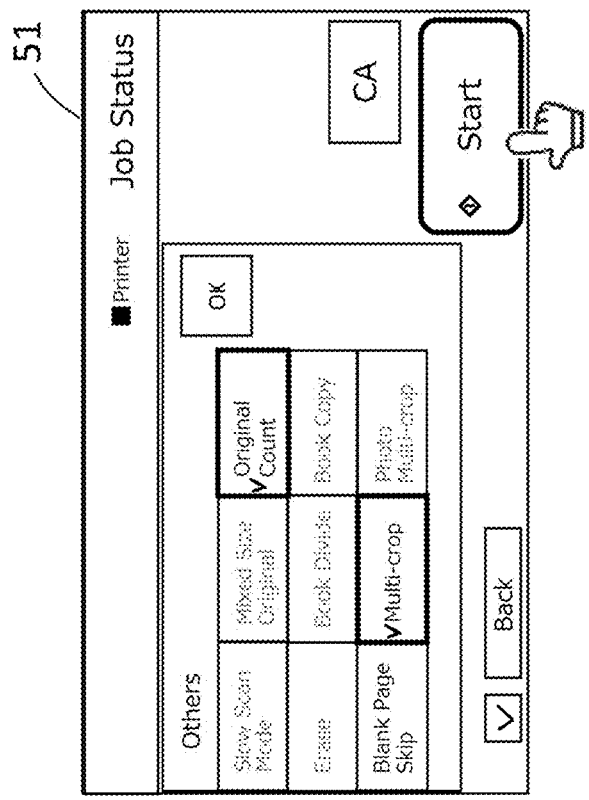
FIG. 22A is a third explanatory view showing the operation procedure of the digital multifunction peripheral shown in FIG. 1 when a continuous multi-crop scan is executed.
Figures 22B, 22C:
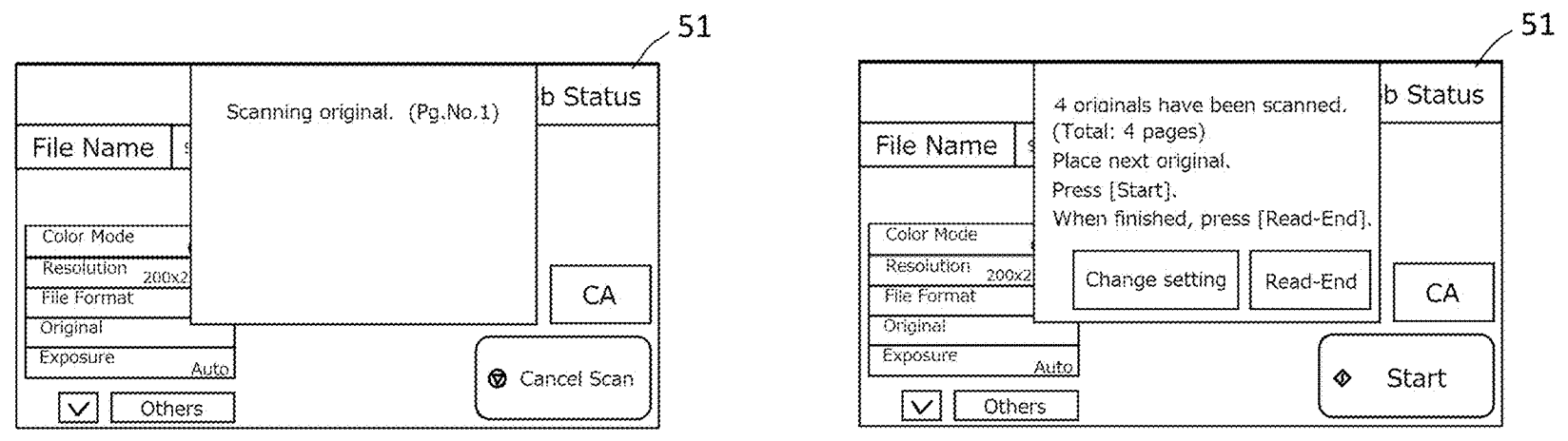
Figure 23:
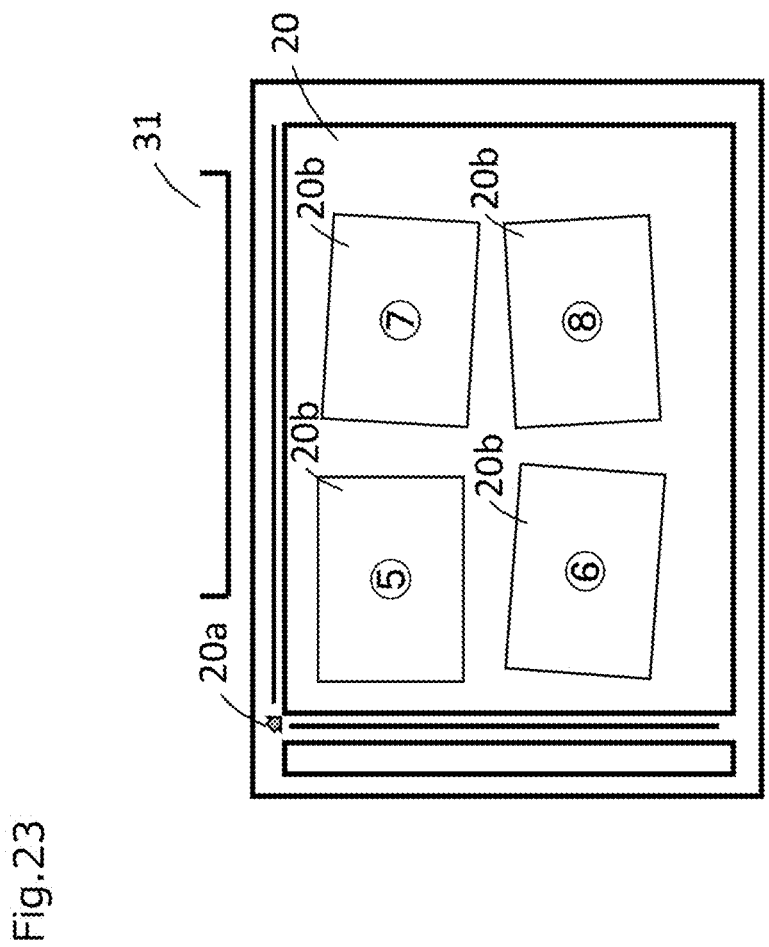
FIG. 23 is an explanatory view showing the state in which multiple originals for the second batch scan are placed on the original table shown in FIG. 3.

When the user presses the "Start" key (see FIG. 22A), the control unit 41 determines a reading-area for the multi-crop scan and causes the scanning unit 21 and the original reading unit 23 to read the four (1 to 4) originals 20b by a batch scan, in response to this operation. While reading, the control unit 41 displays the message of "Scanning original. (Pg. No. 1)" and the operation key of "Cancel scan" as shown in FIG. 22B. The "(Pg. No. 1)" in the message indicates that this is the first batch scan.

After the first batch scan is finished, the cropping unit 25 crops images corresponding to 1 to 4 originals. The control unit 41 displays operation keys of "Read-End", "Change setting", and "Start" along with a message of "4 originals have been scanned. (Total: 4 pages)" on the operation display unit 51, on the basis of the cropping of the originals by the cropping unit 25, to encourage the user to do the next operation (see FIG. 22C).

When the user arranges four (5 to 8) originals which are the objects for the next multi-crop scan on the original table 20 (see FIG. 23) and presses the "Start" key (see FIG. 24A), the control unit 41 starts the next batch scan in response to this operation. Specifically, the control unit 41 determines a reading-area for the multi-crop scan and causes the scanning unit 21 and the original reading unit 23 to read the four originals 20b by a batch scan. While reading, the control unit 41 displays the message of "Scanning original. (Pg. No. 2)" and the operation key of "Cancel scan" as shown in FIG. 24B. The "(Pg. No. 2)" in the message indicates that this is the second batch scan.

The control unit 41 handles the image data obtained by the first batch scan and the image data obtained by the second batch scan as a series of image data.

After the second batch scan is finished, the cropping unit 25 crops images corresponding to four (5 to 8) originals. The control unit 41 displays operation keys of "Read-End", "Change setting", and "Start" along with a message of "4 originals have been scanned. (Total: 8 pages)" on the operation display unit 51, on the basis of the cropping of the originals by the cropping unit 25 (see FIG. 24C).

The message of "4 originals have been scanned." indicates that there are four originals read by the second batch scan, and the part "(Total: 8 pages)" indicates that eight originals in total have been read by a sequence of batch scans starting from the first batch scan.

In this way, the control unit 41 displays the number of originals cropped by each batch scan and the total number of originals cropped from the first batch scan on the operation display unit 51. The control unit 41 makes these displays at every batch scan.

When the user touches the operation key of "Read-End" (see FIG. 24D), the control unit 41 stores the image data of the eight originals in total, which have been read and cropped by two batch scans so far, into the USB memory connected to the USB connector 71. After the writing on the USB memory is finished, the control unit 41 displays the message of "Originals have been scanned (Pg. No. 2)" on the operation display unit 51 (see FIG. 24E).

Figure 25A:
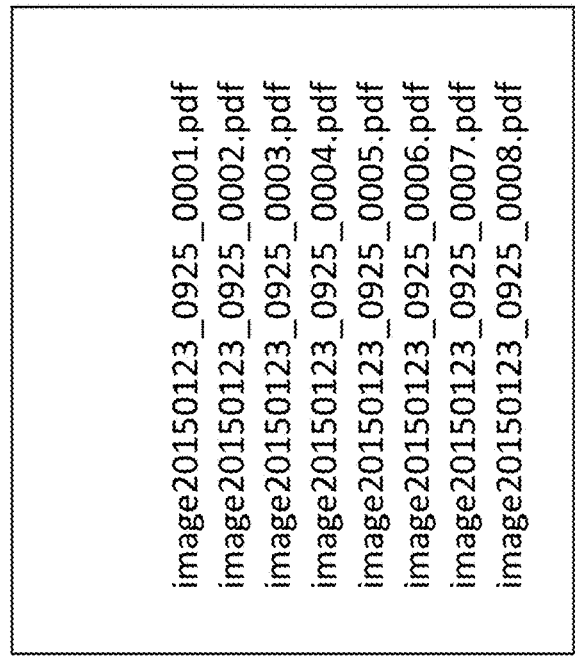
FIG. 25A is an explanatory view showing the state in which image data of originals which have been read by more than one batch scan is stored in an USB memory connected to the digital multifunction peripheral shown in FIG. 1.

As shown in FIG. 25A, the control unit 41 stores the image data corresponding to cropped eight originals in total into the USB memory as eight files stored in one folder. The filename attached to each of the eight files includes information of the date and time at which the first batch scan is executed. The filename also includes information indicating the relation of eight files. The first filename "image20150123_0925_0001.pdf" out of eight files shown in FIG. 25A will be described. The part "20150123" indicates the date of Jan. 23, 2015, and the subsequent part "0925" indicates the time of 9:25. Since the eight files have been read by the continuous multi-crop scan, they have the information of the same date and time. The files also include serial numbers of 0001 to 0008 indicating the relation thereof at the end of the filename of each file.

In addition, the name of the folder storing these files includes the information of the date and time at which the first batch scan is executed (twelfth embodiment).

Figure 25B:
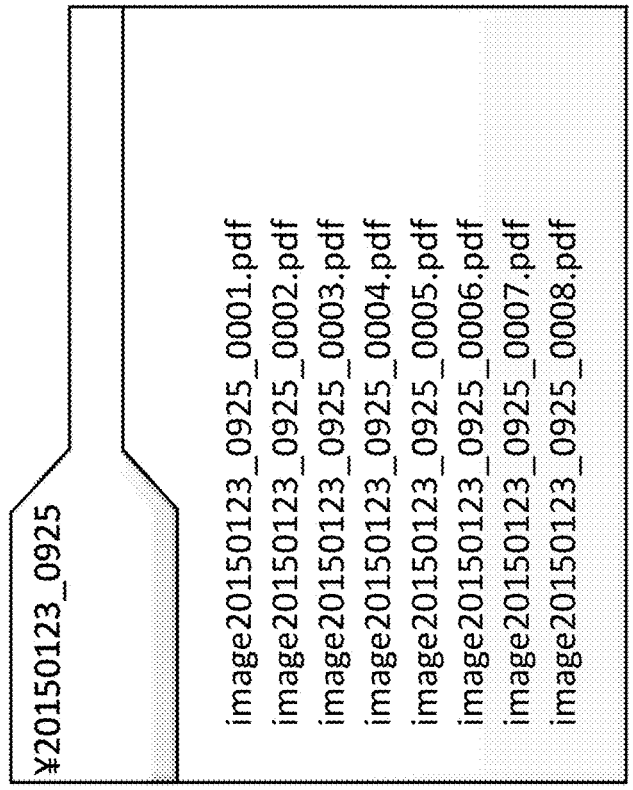
FIG. 25B is an explanatory view showing another embodiment in which image data of originals which have been read by more than one batch scan is stored in an USB memory connected to the digital multifunction peripheral shown in FIG. 1.

FIG. 25B is an explanatory view showing an embodiment different from that in FIG. 25A in which image data of the originals which have been read is stored in the USB memory. In FIG. 25A, the image data of each original cropped by the batch scan is stored in one folder that is newly created. On the other hand, in FIG. 25B, each file is stored without creating a new folder. However, eight files include the information of the date and time at which the first batch scan is executed, as in FIG. 25A. The eight files also include the information indicating the relation of these files. Only from the filenames, it is understood that the eight files are related to one another, since the same date and same time are attached thereto. The information of the time at which the first batch scan is executed is the information at which the multi-crop scan is started. Therefore, this information is considered to be more likely to leave impression on the user than the second and subsequent batch scans. That is, it is considered that the user easily recalls the detail of the file from the time information attached to the filename.

Note that the serial number attached at the end of each file in FIGS. 25A and 25B is merely one example of the information indicating relation. This is similar to the case in FIGS. 17A and 17B.

As described above, in the continuous multi-crop scan, the image of the respective originals read by more than one batch scan is handled as a series of image data so as to be distinguishable from other image data.

On the other hand, in the single multi-crop scan, the images of the respective originals read by each batch scan is handled as a series of image data, but they are handled as being distinguished from image data read by other batch scans, such as a previous or next batch scan.

<<Operation Procedure of Continuous Multi-Crop Scan>>

The process in which the control unit 41 executes the above-mentioned multi-crop scan will comprehensively be described.

Figure 26:
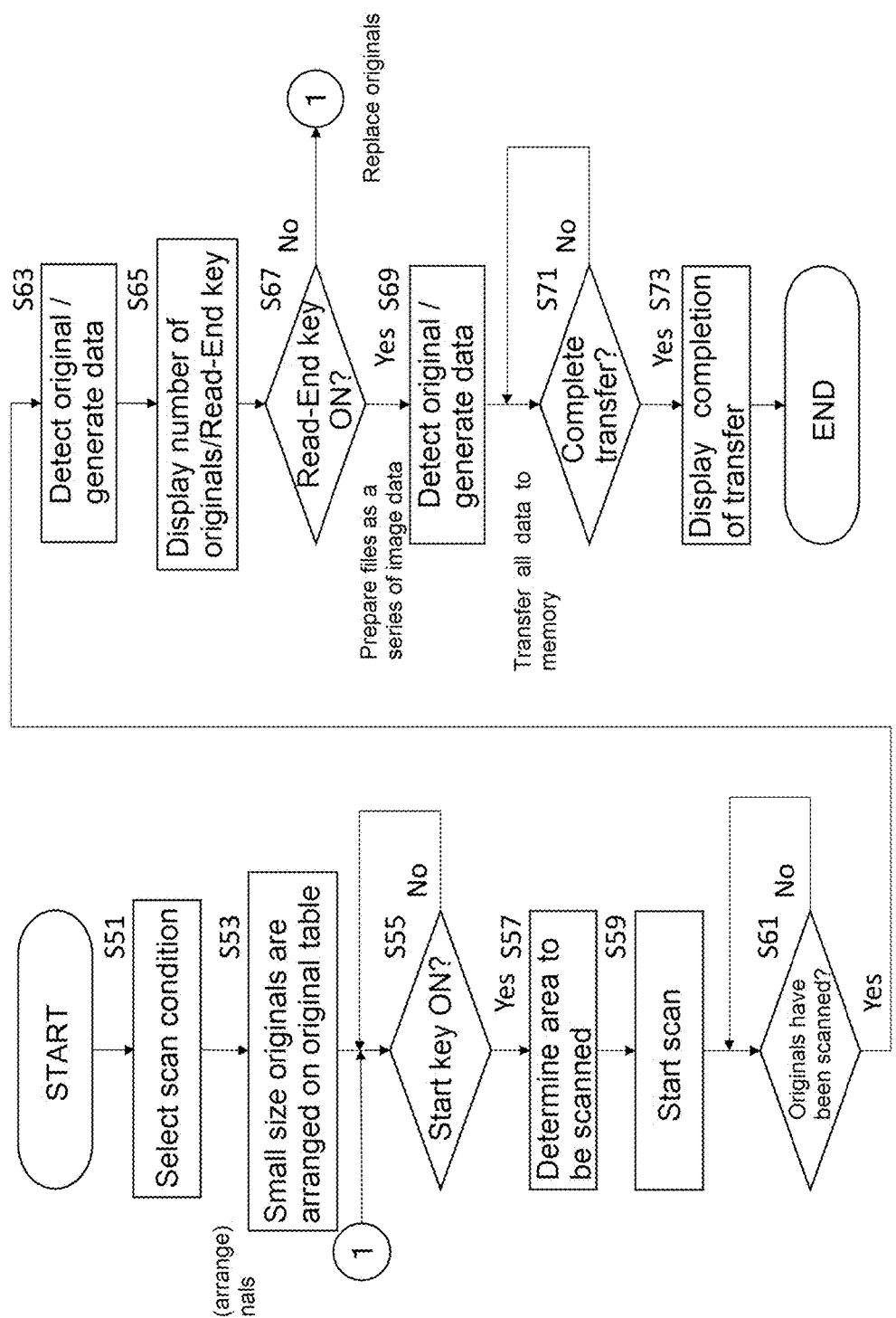
FIG. 26 is a flowchart showing a process executed by the control unit while in the continuous multi-crop scan.

FIG. 26 is a flowchart illustrating the process executed by the control unit when the continuous multi-crop is selected. As shown in FIG. 26, the control unit 41 displays a screen for allowing a user to select the scanning condition and multi-crop on the operation display unit 51 (step S51, corresponding to FIGS. 14A to 14D). Then, the control unit 41 requests the user to leave the original cover open (corresponding to FIGS. 14E to 14F). The control unit 41 then waits until the user touches the "Original count" key to select the continuous multi-crop (corresponding to FIGS. 20A and 20B), multiple originals are arranged on the original table 20 (step S53, corresponding to FIG. 21), and the "Start" key is pressed (step S55).

When the "Start" key is pressed (Yes in step S55, corresponding to FIG. 22A), the control unit 41 determines the maximum readable area as a reading-area (step S57), and then, starts scanning and reading of the originals (step S59). Then, the control unit 41 waits until the reading by the batch scan is finished (step S61, corresponding to FIG. 22B).

After finishing the reading, the control unit 41 controls such that the cropping unit 25 crops the image data of each original (step S63), and displays the cropped result on the operation display unit 51 (step S65, corresponding to FIG. 22C). Then, the control unit 41 waits until the "Read-End" key is pressed (step S67) or the "Start" key is pressed (step S55 through No in step S67).

When the originals to be read next are arranged on the original table (corresponding to FIG. 23) and the "Start" key is pressed (Yes in step S55, corresponding to FIG. 24A), the control unit 41 determines the maximum readable area as a reading-area (step S57). Then, the control unit 41 performs the second batch scan (steps S59 to S65, corresponding to FIG. 24B).

Figure 24D:
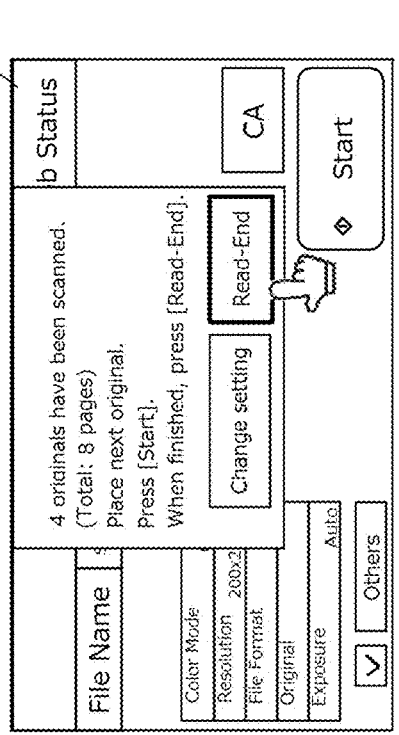
FIG. 24D is a ninth explanatory view showing the operation procedure of the digital multifunction peripheral shown in FIG. 1 when a continuous multi-crop scan is executed.
Figure 24C:
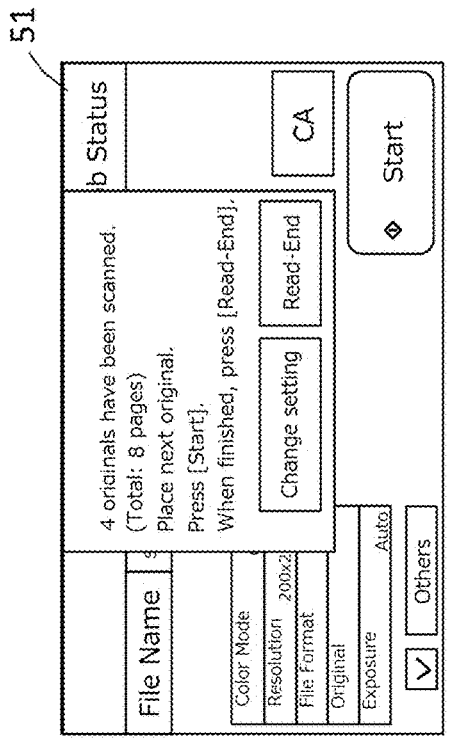
FIG. 24C is an eighth explanatory view showing the operation procedure of the digital multifunction peripheral shown in FIG. 1 when a continuous multi-crop scan is executed.
Figure 24E:
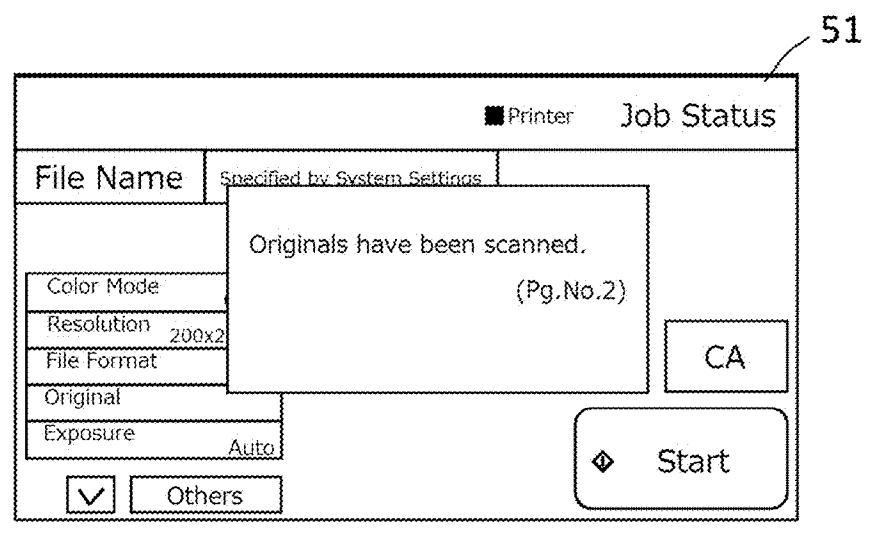

The control unit 41 then waits again until the "Read-End" key is pressed (step S67) or the "Start" key is pressed (step S55 through No in step S67, corresponding to FIG. 24C).

When the "Read-End" key is pressed, the control unit 41 ends the reading (Yes in step S67, corresponding to FIG. 24D).

Then, the control unit 41 controls such that the cropping unit 25 crops the image data of the last original which has been read (step S69), and starts the transfer of the image data of the originals, which have been read, to the memory (step S71). In the present embodiment, the image data is transferred to the USB memory connected to the USB connector 71. However, this is merely one example. In the continuous multi-crop scan, if the copying function is selected, the control unit 41 transfers the image data to the image forming apparatus 12 through the image output unit 27, as in the single multi-crop scan. If the scanner function is selected, the control unit 41 may transmit the image data to an external device connected to a network through the communication unit 45. If the image filing function is selected, the control unit 41 transfers the image data to the storage unit 43 and stores the same therein. If the facsimile function is selected, the control unit 41 transmits the image data through the communication unit 45 and a public line.

After completing the transfer of the image data (Yes in step S71), the control unit 41 notifies the user of the completion of the transfer (step S73, corresponding to FIG. 24E), and ends the process.

<<Photo Multi-Crop (Inversion Multi-Crop)>>

It has already been described that, in the ordinary multi-crop scan, that is, in the non-inversion multi-crop scan, the original cover is left open and the scanning is performed in order that the area outside of an original is read as black with respect to a white or light tone base of the original. The cropping unit 25 crops the image corresponding to the original by recognizing the border of the originals on the basis of the contrast between the light tone base of the originals and the black color of the area outside of the originals.

However, an original may have a dark tone edge depending on a type of an original. An original with an edge locally having a dark tone can precisely be cropped on the premise that the original has a rectangular shape. However, if an original has a lot of dark tone parts, it cannot sufficiently be cropped in some cases.

A typical example of an original with a dark tone edge is an original of a photo of night scenes without borders. A photo of the same night scenes with borders have a white edge, so that the cropping unit 25 can crop each original from the image read with the original cover 33 being left open. However, in a photo without borders, the contrast between the night scenes and the area outside of the original is insufficient.

An original with a dark tone edge, such as a photo of night scenes without borders, had better be read with the original cover 33 being closed in order that the area outside of the original is read as white. The lower surface of the original cover 33 is white. This is to prevent the generation of a sense of strangeness between a standard size original with white or light tone base and the original cover 33, even if the original cover (document holder) that is the area outside of the original is read when the original is read.

In view of this, it is preferable that a multi-crop function for an original having a dark tone edge is provided separately from the ordinary multi-crop, and the user can select either one of multi-crops according to an original.

In the present embodiment, the multi-crop function for an original having a dark tone edge is referred to as "photo multi-crop" or "inversion multi-crop". While in the ordinary multi-crop (non-inversion multi-crop), the control unit 41 requests the user to leave the original cover 33 open (for example, see FIGS. 14E and 14F), the control unit 41 requests the user to close the original cover 33 in the photo multi-crop. Then, the cropping unit 25 recognizes the border of each original and crops the image corresponding to the original on the basis of the contrast between a dark tone base of the original and light tone of the area outside of the original. In this case, the grayscale of the image obtained by the batch scan may be inverted, and then, the cropping unit 25 may perform cropping. The cropped image of each original is stored in the memory after the grayscale thereof is again inverted. According to this configuration, the area outside of an original has a black color or a dark tone in any of the inversion multi-crop and the non-inversion multi-crop, whereby an image can be cropped by the same process.

FIG. 27A shows an example of an image read by a batch scan in the ordinary multi-crop. FIG. 27A shows the example in which multiple photo originals with borders having a dark tone edge are read with the original cover being left open.

FIG. 27B shows an example of an image read by a batch scan in the photo multi-crop. FIG. 27B shows the example in which multiple photo originals without borders having a dark tone edge are read with the original cover being closed.

FIGS. 28A to 28D are explanatory views showing one example of an operation procedure when the photo multi-crop scan is performed by the digital multifunction peripheral 10.

For the selection of the photo multi-crop scan, the digital multifunction peripheral 10 which has been in the stand-by mode is brought into the state in which the screen illustrated in FIG. 14C is displayed through the screens in FIGS. 11A, 11B, 14A, and 14B. The "Photo Multi-crop" key is disposed at the right of the "Multi-crop" key on the screen in FIG. 14C.

When the user touches the "Photo Multi-crop" key (see FIG. 28A), the control unit 41 displays a check mark indicating that the "Photo Multi-crop" key is selected on the "Photo Multi-crop" key in response to this operation. The control unit 41 also displays a message of "Be sure to close the automatic document feeder and press [Start] to scan." along with an "OK" key on the operation display unit 51 (see FIG. 28B).

Figure 28A:
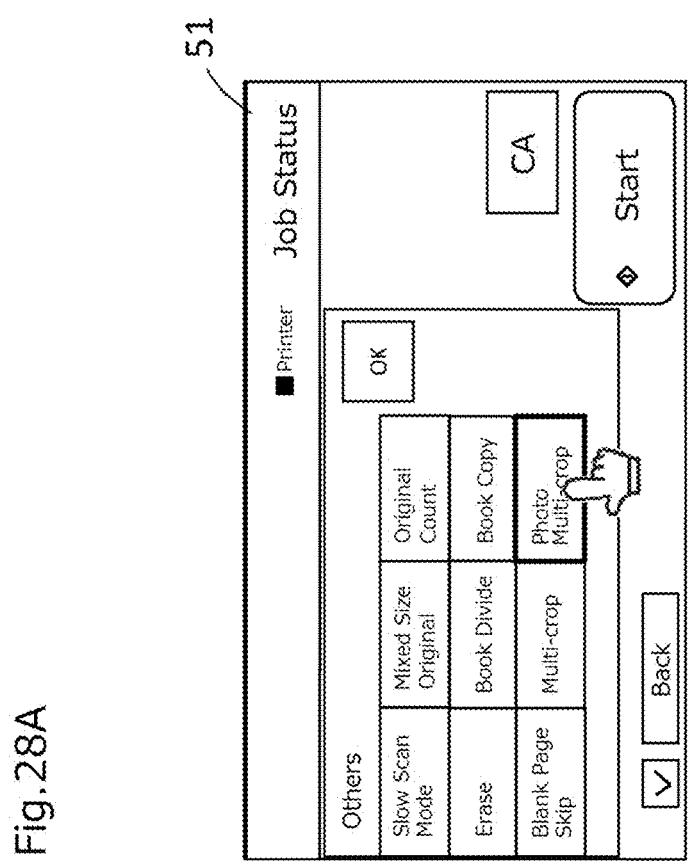
FIG. 28A is a first explanatory view showing an operation procedure of the digital multifunction peripheral shown in FIG. 1 when a photo multi-crop is executed.
Figure 28B:
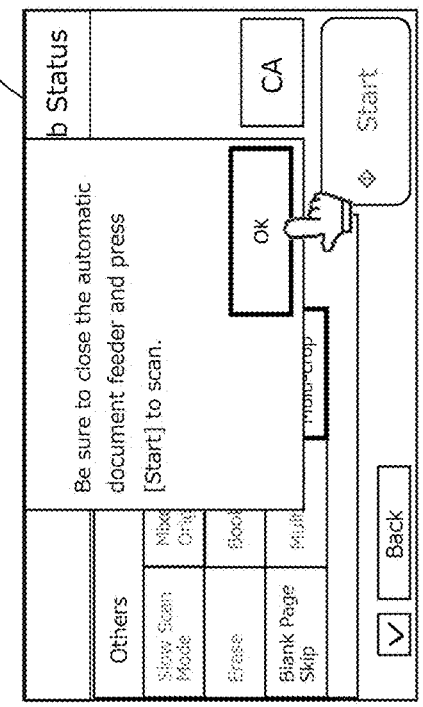
FIG. 28B is a second explanatory view showing the operation procedure of the digital multifunction peripheral shown in FIG. 1 when a photo multi-crop is executed.
Figure 28C:
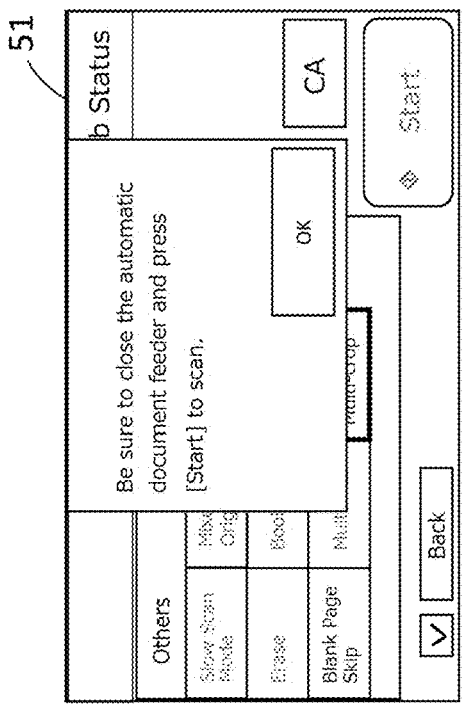
FIG. 28C is a third explanatory view showing the operation procedure of the digital multifunction peripheral shown in FIG. 1 when a photo multi-crop is executed.
Figure 28D:
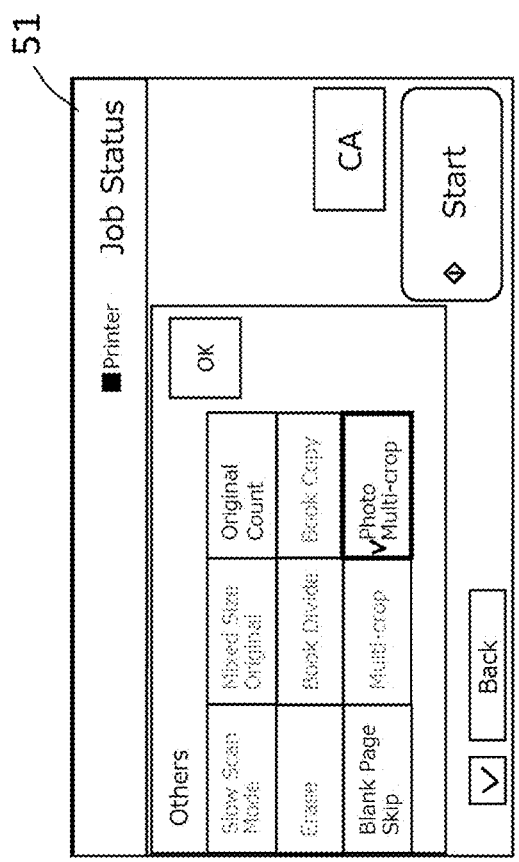
FIG. 28D is a fourth explanatory view showing the operation procedure of the digital multifunction peripheral shown in FIG. 1 when a photo multi-crop is executed.

When the user reads the message of "Be sure to close the automatic document feeder and press [Start] to scan." and presses the "OK" key (see FIG. 28C), the control unit 41 erases the message in response to this operation (see FIG. 28D).

The user arranges multiple originals, which are the objects for the multi-crop scan, on the original table 20, and then, closes the original cover 33. After the user presses the "Start" key, the control unit 41 starts the batch scan for the photo multi-crop.

As shown in FIG. 27B, the cropping unit 25 recognizes the border of the originals on the basis of the dark tone edges of the originals and the white color at the area outside of the originals, and performs cropping.

Since the control unit 41 can acquire the open state and closed state of the original cover 33 by the cover opening-and-closing sensor 35, the control unit 41 may invalidate the "Start" key to inhibit the start of the batch scan while the original cover 33 is left open (thirteenth embodiment).

Alternatively, in the case where the "Start" key is pressed with the original cover 33 being left open, the control unit 41 may inhibit the start of the batch scan, and display a message for encouraging the user to close the original cover 33 and again press the "Start" key on the operation display unit 51 (fourteenth embodiment).

The other operation procedure is similar to the ordinary multi-crop scan.

<<Different Embodiment in Selecting Photo Multi-Crop>>

In the above example, the "Photo Multi-crop" key is prepared separately from the "Multi-crop" key, and the user selects the function of the photo multi-crop by touching the "Photo Multi-crop" key. In this embodiment, the example of selecting the photo multi-crop by the operation procedure different from the above example will be described.

FIGS. 29A to 29I are explanatory views showing different example of the operation procedure for performing the photo multi-crop scan by the digital multifunction peripheral 10.

Figures 29A, 29B:
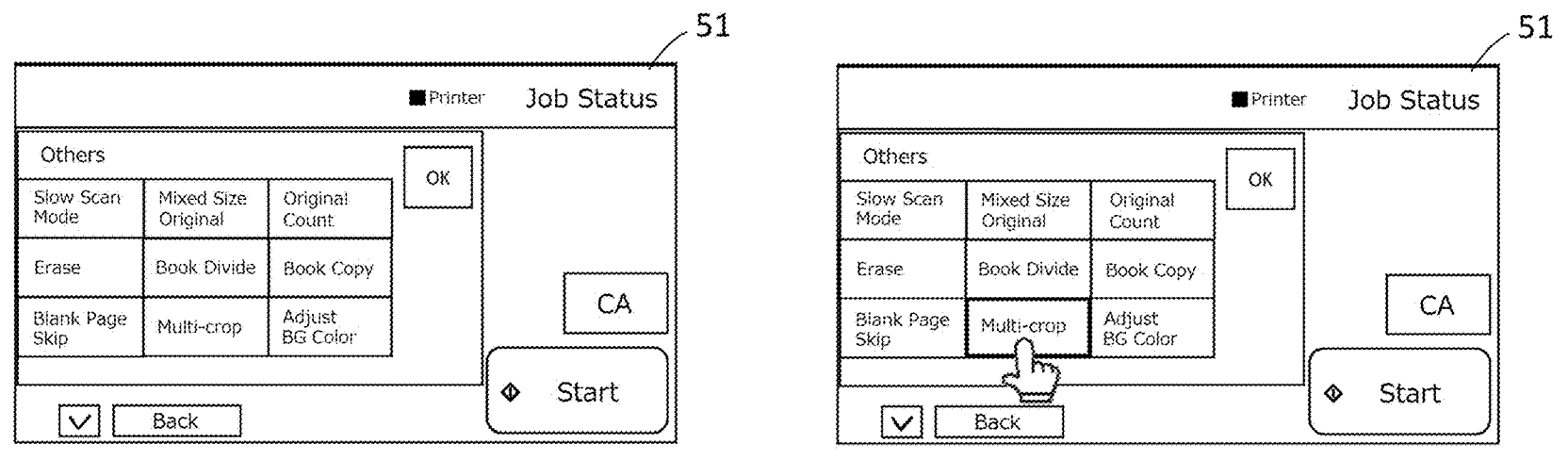

As in the above example, for the selection of the photo multi-crop, the digital multifunction peripheral 10 which has been in the stand-by mode is brought into the state in which the screen illustrated in FIG. 29A is displayed through the screens in FIGS. 11A, 11B, 14A, and 14B. On the screen in FIG. 29A, the "Multi-crop" key is displayed but the "Photo Multi-crop key" is not displayed and included in the "Multi-crop".

When the user touches the "Multi-crop" key (see FIG. 29B), the control unit 41 displays a check mark indicating that the "Multi-crop" is selected on the "Multi-crop" key in response to this operation. Then, the control unit 41 displays a message of "Specify tone of originals." along with an operation key of "Light tone" and an operation key of "Dark tone" on the operation display unit 51 to encourage the user to select either one of tones.

When the user touches the "Light tone" key (see FIG. 29D), the control unit 41 determines that the ordinary multi-crop mode is selected on the basis of this operation. Then, the control unit 41 displays the message of "Leave the automatic document feeder open and press [Start] to scan." along with the "OK" key on the operation display unit 51 (see FIG. 29E).

When the user reads the message of "Leave the automatic document feeder open and press [Start] to scan." and presses the "OK" key (see FIG. 29F), the control unit 41 erases the message in response to this operation.

The operation procedure after that is similar to the operation procedure described with reference to FIGS. 15 and 16A to 16C.

Figure 29C:
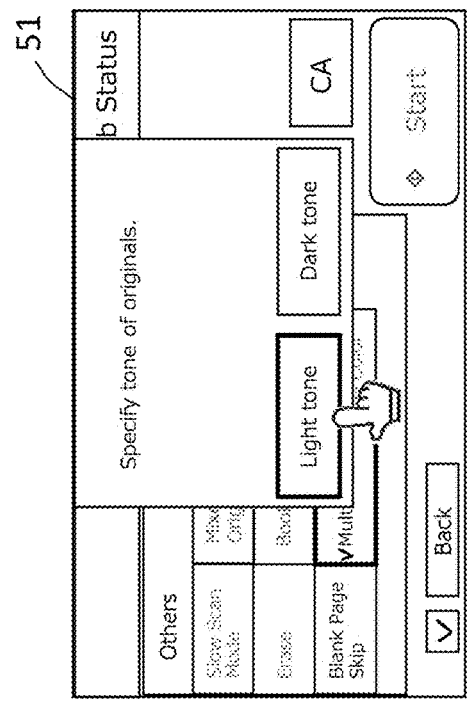
FIG. 29C is a third explanatory view showing another embodiment of the operation procedure of the digital multifunction peripheral shown in FIG. 1 when a photo multi-crop is executed.
Figure 29D:
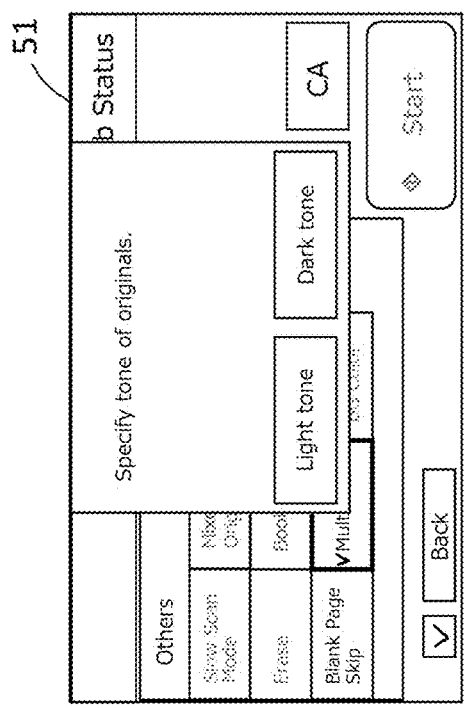
FIG. 29D is a fourth explanatory view showing another embodiment of the operation procedure of the digital multifunction peripheral shown in FIG. 1 when a photo multi-crop is executed.
Figures 29E, 29F:
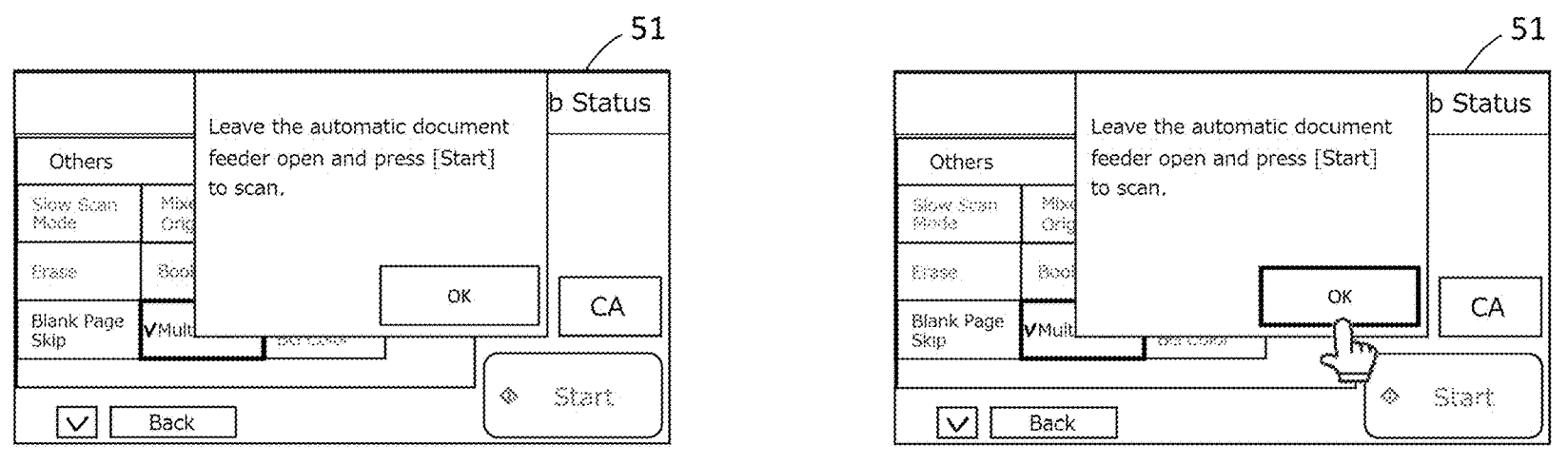
Figure 29G:
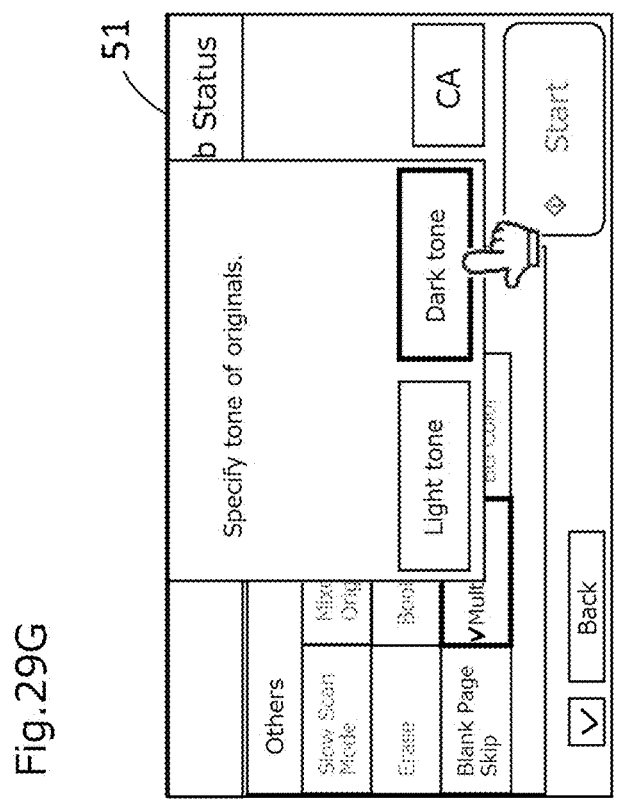
FIG. 29G is a seventh explanatory view showing another embodiment of the operation procedure of the digital multifunction peripheral shown in FIG. 1 when a photo multi-crop is executed.
Figure 29I:
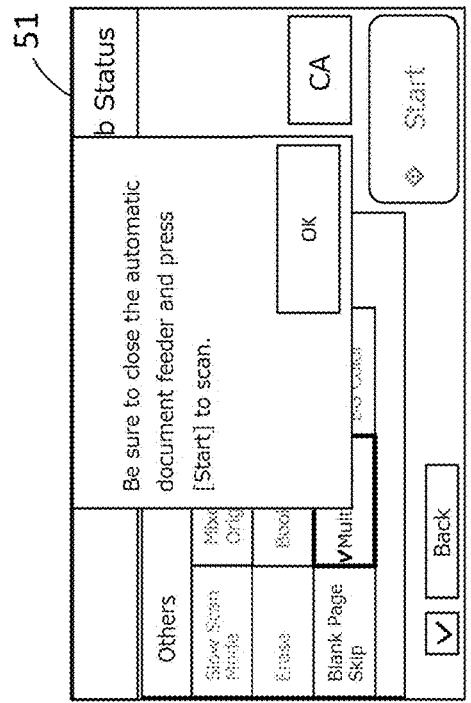
FIG. 29I is a ninth explanatory view showing another embodiment of the operation procedure of the digital multifunction peripheral shown in FIG. 1 when a photo multi-crop is executed.
Figure 29H:
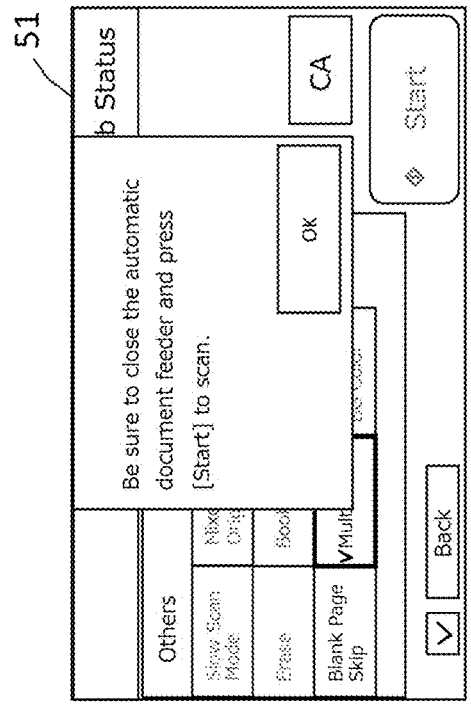
FIG. 29H is an eighth explanatory view showing another embodiment of the operation procedure of the digital multifunction peripheral shown in FIG. 1 when a photo multi-crop is executed.

On the other hand, when the user touches the "Dark tone" key on the screen illustrated in FIG. 29C (see FIG. 29G), the control unit 41 determines that the photo multi-crop is selected in response to this operation. Then, the control unit 41 displays the message of "Be sure to close the automatic document feeder and press [Start] to scan." along with the "OK" key on the operation display unit 51 (see FIG. 29H).

When the user reads the message of "Be sure to close the automatic document feeder and press [Start] to scan." and presses the "OK" key (see FIG. 29I), the control unit 41 erases the message in response to this operation.

The operation procedure after that is similar to the operation procedure of the photo multi-crop previously described.

As described above,
(i) the image reading apparatus according to the present invention includes: original reading circuitry as an original reading unit configured to read an image of each of multiple originals placed on an original table in batch by a batch-scan; a cropping unit configured to crop an image of each original from an entire image which is read by the batch-scan; an image output unit configured to output a cropped image of each original; and control circuitry as a control unit configured to control the original reading unit, and execute processes of the cropping unit and the image output unit, wherein the control unit is capable of selectively executing: an inversion multi-crop process in which an image density of an edge of each original is supposed to be higher than an image density of a reading-area outside of the original, and an area to be cropped is determined on the basis of a difference in the image density between the edge and the reading-area outside of the original; and a non-inversion multi-crop process in which an image density of an edge of each original is supposed to be lower than an image density of a reading-area outside of the original, and an area to be cropped is determined on the basis of a difference in the image density between the edge and the reading-area outside of the original.

In the present invention, the original table is the location where an original is placed when an image of the original is to be read, and the original reading unit reads the image of the original placed on the original table. The specific configuration thereof is, for example, an area where a glass plate or a transparent resin plate is horizontally placed, and an original is placed thereon with a surface which should be read facing downward. The original reading unit scans the original upward from below the plate to read the image. However, the nature of the present invention is not limited thereto. For example, the present invention also includes a configuration in which an original is placed on a non-transparent or transparent original table with the surface which should be read facing upward, and the original is scanned from above the original table.

Flat sheet-type originals are typical. However, the original is not limited thereto, and may have irregularities or may be a 3D object.

In addition, the multi-crop process is to scan multiple originals which are simultaneously placed on the original table in batch and crop an image of each original. The process for reading an image of an original, which is sequentially replaced one by one using an automatic document feeder or the like, on the original table is not included in the batch scan.

To crop an image of an original means that an image area corresponding to each original is extracted from the entire reading-area by the batch scan and trimming is performed. In the multi-crop process, a plurality of image areas, each of which corresponds to each original, is extracted from the entire reading-area.

Preferable configurations of the present invention will further be described.
(ii) The image reading apparatus may further include an operation input unit configured to receive a selection by a user between the inversion multi-crop process and the non-inversion multi-crop process.

According to this configuration, the selection between the inversion multi-crop process and the non-inversion multi-crop process is received on the basis of the operation by the user placing multiple originals on the original table, whereby the user can set, using a scanning input unit, such that a set of originals having light tone edges and a set of originals having dark tone edges are respectively scanned in batch so as to appropriately crop an image of each original.
(iii) The image reading apparatus may be configured such that the operation input unit allows the user to select a feature of an original image, and the control unit determines which one of the inversion multi-crop process and the non-inversion multi-crop process is to be executed on the basis of the feature of the original image selected by the operation input unit.

This configuration allows the user to select the inversion multi-crop process or the non-inversion multi-crop process on the basis of features of the images of the originals which should be scanned in batch, not on the basis of the procedure of an image process or the like. Thus, the user can easily understand the meaning in selecting each process, and can make appropriate selection.
(iv) The image reading apparatus may further include: an original cover configured to be openable with respect to the original table and holds an original placed on the original table; and a display unit configured to display a guide concerning an operation to a user, wherein the control unit may display, on the display unit, an operation guide indicating that the original is scanned with the original cover being left open when the inversion multi-crop process is selected, and may display, on the display unit, an operation guide indicating that the original is scanned with the original cover being closed when the non-inversion multi-crop process is selected.

According to this configuration, the originals can be scanned with the original cover being left open or closed to increase the difference in tone between the edges of the originals and the outside of the originals, according to the selection between the inversion multi-crop process and the non-inversion multi-crop process.

(v) The image reading apparatus may further include: a cover open/close sensor configured to detect an open and close state of the original cover, wherein the control unit may inhibit a scan in the case where the cover open-and-close sensor detects that the original cover is closed regardless of the display requesting that the original is to be scanned with the original cover being left open, or in the case where the cover open-and-close sensor detects that the original cover is opened regardless of the display requesting that the original is to be scanned with the original cover being closed.

According to this configuration, the originals can be scanned in batch with the original cover being reliably left open or closed to increase the difference in tone between the edges of the originals and the outside of the originals, according to the selection between the inversion multi-crop process and the non-inversion multi-crop process.

Preferable embodiments of the present invention include a combination of any of the above two or more configurations.

In addition to the above-described embodiments, there can be various modified examples of the invention. Such modified examples should not be deemed to be out of the scope of the invention. The invention should include all the modified examples within the meaning and range of equivalency of scope of the claims.

What is claimed is:

1. An image reading apparatus comprising:
    an original reading unit configured to read an image of each of multiple originals placed on an original table in batch by a batch-scan;
    a cropping unit configured to crop an image of each original from an entire image which is read by the batch-scan;
    an image output unit configured to output a cropped image of each original; and
    a control unit configured to control the original reading unit, the cropping unit, and the image output unit,
    wherein the control unit makes the original reading unit read the image by a batch-scan in which an image density of an edge of each original is supposed to be lower than an image density of a reading-area outside of the original, and an area to be cropped is determined on the basis of a difference in the image density between the edge and the reading-area outside of the original.

2. The image reading apparatus according to claim 1, further comprising
    an original cover configured to be openable with respect to the original table, and
    a cover open/close sensor configured to detect an open and close state of the original cover, wherein
    the control unit allows the original reading unit to read the image by the batch-scan when the cover open-and-close sensor detects that the original cover is opened.

3. The image reading apparatus according to claim 2, wherein the control unit inhibits the original reading unit from reading the image by the batch-scan when the cover open-and-close sensor detects that the original cover is closed.

* * * * *